(12) United States Patent
Kewitsch et al.

(10) Patent No.: US 6,801,310 B2
(45) Date of Patent: Oct. 5, 2004

(54) LIQUID CRYSTAL MODULATOR AND POLARIZATION DIVERSITY OPTICS FOR OPTICAL COMMUNICATIONS

(75) Inventors: Anthony S. Kewitsch, Santa Monica, CA (US); George Rakuljic, Santa Monica, CA (US); Victor Leyva, Pasadena, CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 95 days.

(21) Appl. No.: 10/209,879

(22) Filed: Aug. 2, 2002

(65) Prior Publication Data

US 2003/0095305 A1 May 22, 2003

Related U.S. Application Data

(63) Continuation-in-part of application No. 10/187,855, filed on Jul. 3, 2002.
(60) Provisional application No. 60/347,964, filed on Nov. 7, 2001.

(51) Int. Cl.[7] .................................................. G01J 3/28
(52) U.S. Cl. ......................................... 356/328; 398/84
(58) Field of Search ................................ 356/328, 334, 356/323; 398/79, 82–84

(56) References Cited

U.S. PATENT DOCUMENTS

| | | | |
|---|---|---|---|
| 5,414,540 A | 5/1995 | Patel et al. | |
| 5,724,165 A * | 3/1998 | Wu | 398/55 |
| 6,134,358 A | 10/2000 | Wu et al. | |
| 6,175,432 B1 | 1/2001 | Wu et al. | |
| 6,181,846 B1 | 1/2001 | Pan | |
| 6,201,593 B1 | 3/2001 | Wong et al. | |
| 6,208,442 B1 | 3/2001 | Liu et al. | |
| 6,262,644 B1 | 7/2001 | Castonguay et al. | |
| 6,275,623 B1 * | 8/2001 | Brophy et al. | 385/14 |
| 6,285,500 B1 | 9/2001 | Ranalli et al. | |
| 6,327,109 B1 | 12/2001 | Kori et al. | |
| 6,658,212 B1 * | 12/2003 | Trutna et al. | 398/79 |

OTHER PUBLICATIONS

Patel, J.S., Silberberg, Y.; Liquid Crystal and Grating–Based Multiple–Wavelength Cross–Connect Switch; IEEE Photonics Tech Ltrs, vol. 7, No. 5, 1995.
US 2002/0009257/US Patent Application Publication; Optical Configuration for a Dynamic Gain Equalizer and a Configurable Add/Drop Multiplexer; Bouevitch et al.

* cited by examiner

*Primary Examiner*—F. L. Evans
*Assistant Examiner*—Kara Geisel
(74) *Attorney, Agent, or Firm*—Jones, Tullar & Cooper, P.C.

(57) ABSTRACT

For systems which disperse individual wavelength components of a DWDM beam into an array of converging beams, the individual wavelength signals are modified for blocking, equalization or other purposes by reflective liquid crystal cells. Thus modulated or modified components are then recombined by the system into an output beam, as by reverse passage through the system. Controlled full extinction or linear attenuation may be introduced by converging asymmetrical beams of separate polarization components for each wavelength into superposed relation on zero twist nematic crystal cells which are voltage controlled so as to retard for extinction of greater than 40 dB or to transform the state of polarization to a selected angle for attenuation. Polarization sensitive elements in the return paths of the reflected beams then filter the rejected components.

75 Claims, 10 Drawing Sheets

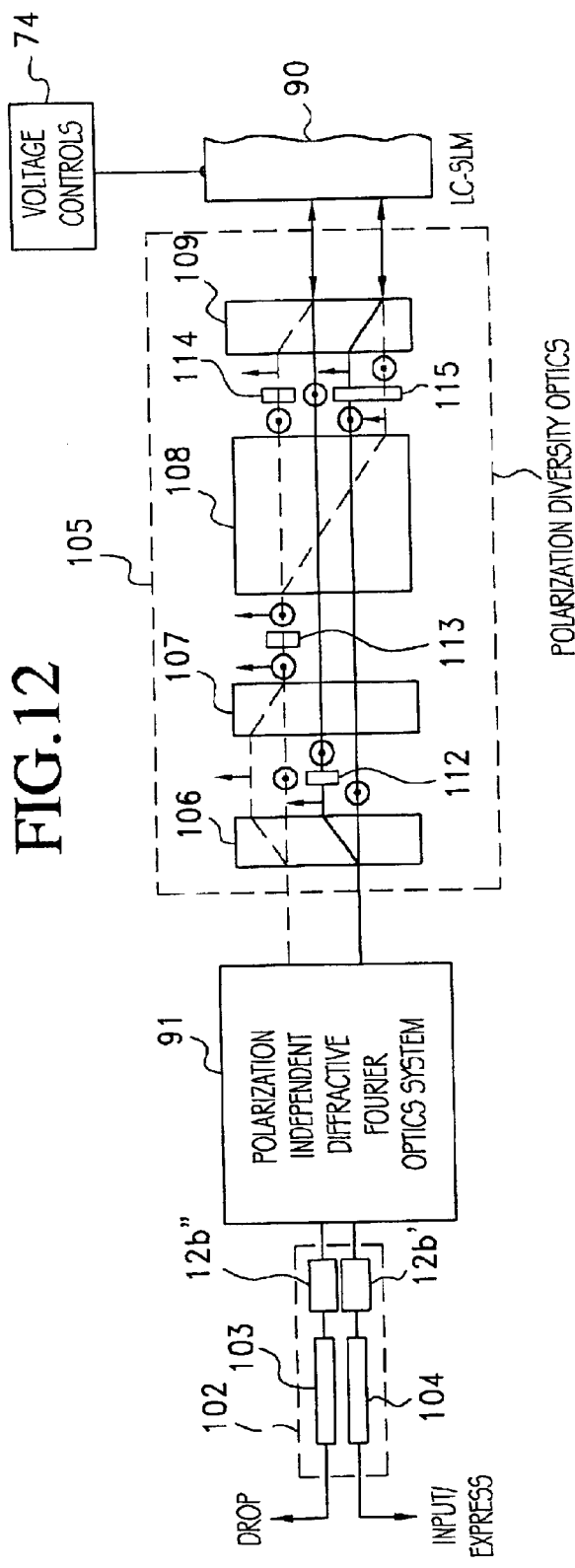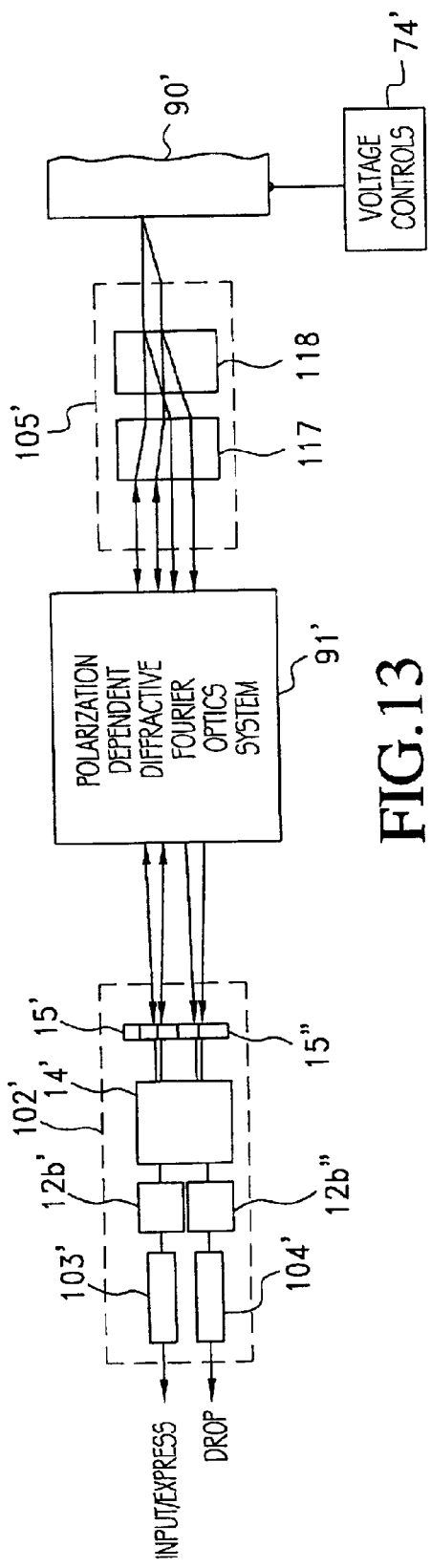

LIQUID CRYSTAL MODULATOR AND POLARIZATION DIVERSITY OPTICS FOR OPTICAL COMMUNICATIONS

REFERENCE TO RELATED APPLICATIONS

This application relies for priority on provisional application 60/347,964 of George Rekuljic et al., filed Nov. 7, 2001 and entitled "Optical Communication Beam Control Units and Systems and Methods Using the Same". This application also is a continuation-in-part of the invention of George Rakuljic et al. entitled "Diffractive Fourier Optics for Optical Communications" Ser. No. 10/187,855 filed Jul. 3, 2002.

FIELD OF THE INVENTION

This invention relates to optical communications using separation techniques to control individual wavelengths of dense wavelength division multiplexed beams, and more particularly to systems and methods which use liquid crystal spatial light modulation to efficiently modify individual wavelength components that have arbitrary states of polarization.

BACKGROUND OF THE INVENTION

Next generation optical networks will focus on economically exploiting the inherent bandwidth of optical fiber. A primary technique now used for that purpose is dense wavelength division multiplexing (DWDM), which propagates a number of wavelength signals or channels each separated in accordance with standardized protocols to provide 25, 50, 100 GHz, etc., channel separation at specified data rates, in consequence of which the bandwidth of optical fiber is more effectively utilized. Optical routing, agile wavelength provisioning, and precise wavelength management are key characteristics needed for these next generation communication systems. These systems must provide the end user with the ability to perform attenuation, blocking and switching in a channel independent fashion.

Optical communication systems, however, impose a number of particular and demanding requirements on units that are to modify, block, split, equalize or add individual wavelengths. These requirements involve among other things the need for low chromatic dispersion, low polarization mode dispersion, low polarization dependent frequency and loss, and other factors which constitute, at various levels, unacceptable aberrations in optical signals. Such factors are becoming increasingly stringent as data rates are increased and wavelength separations are reduced. For example, even at 50 GHz separation, prior art units have difficulty in meeting existing performance needs on a per wavelength basis. Optical systems with these dense channel separations are even less tolerant of optical signal aberrations which compromise insertion loss and channel isolation. Additional performance factors, such as linear attenuation within a wide dynamic range and high extinction ratio, can also be of crucial importance, depending on the system application.

Various techniques are known for beam control along a pixel array, but the leading approach in the field of optical communications is to utilize liquid crystal spatial light modulators (LC-SLMs). LC-SLMs consist of an array of individual pixels or cells that can be individually controlled electrically and suitably miniaturized. Extensive development and production work has been done on these devices for large scale projection and flat panel television systems. The properties needed for optical communication cells and the special needs of data transmission, however, impose different demands. For optical communications, the cells can be used in analog fashion to function as attenuators, limiters, or equalizers, or they can also or separately be used in a digital fashion, in which case they function to control optical beams between essentially full transmission and full extinction (>40 dB) states. In display applications, the modulation of the optical properties of the cells can accommodate a degree of unwanted variations, because a display will still appear consistent or flicker-free to the viewer. Fiber optic applications, however, require a much more precise and uniform optical response and freedom from subtle aberrations, and therefore demand new and unique designs to meet optical systems requirements.

Operative cells in LC-SLM arrays can be disposed within existing optical modules, provided that they meet specific performance specifications, because they are sized and spaced for accepting spatially separated wavelength signals and have low power demands. Therefore they can conveniently be used in systems such as routers, multiplexers, demultiplexers and dynamic equalizers for multiple channels in optical networks. Systems with LC-SLM arrays can in turn be incorporated into broader system designs, so as to provide new system and method capabilities. For example, a new multichannel optical filter system is now known which disposes a complementary combination of Fourier optics and diffraction gratings in a very compact configuration employing multiple three dimensional folding at small angles of two dimensional beam patterns. The system generates, from an input wavelength multiplexed signal, a plurality of parallel, spatially and spectrally distributed but closely adjacent beams. Individual wavelength components can be modified statically, dynamically, or in a predetermined and preset fashion, and then can be recombined by three dimensional folding to provide a reconfigured WDM output. The introduction of a dynamic multi-cell control array to modulate the individual demultiplexed beams enables generation of a wide range of possibilities for new optical communications networks.

Liquid crystals for switch and/or attenuator applications have been described generically in numerous papers and patents. For example, Ranalli et al. (U.S. Pat. No. 6,285,500) describe a wavelength selective switch utilizing diffraction gratings, a twisted nematic LC cell, an LC-SLM linear array, and a complex four-port configuration with polarization independence achieved by splitting the s and p polarizations at the input into separated paths which propagate in parallel through the filter, to be recombined at the outputs by polarization beam splitters. Liquid crystal SLM arrays have been used in numerous designs of all-optical crossconnects. The techniques and processes to fabricate LC-SLM components are clearly quite advanced and are based on years of design and manufacturing development derived from flat panel displays. Patel (U.S. Pat. No. 6,252,644) describes a wedge shaped liquid crystal cell which provides high extinction by introducing a gradient in thickness of the twisted nematic liquid crystal cell in the lateral direction. The application of this type of cell to a WDM switch is described, for example, in the article "Liquid crystal and grating based multiple wavelength cross connect switch," IEEE Photonics Technology Letters, vol. 7, no. 5, May 1995, pp. 514–516.

Wu et al. (U.S. Pat. Nos. 6,175,432 and 6,134,358) describe a multi-wavelength crossconnect utilizing polarization beam splitters, birefringent crystal filter elements and liquid crystal polarization rotators. Liu et al. (U.S. Pat. No. 6,208,442) describe a programmable optical multiplexer based on similar concepts. Wong et al. (U.S. Pat. No. 6,201,593) disclose a multiple wavelength, twisted nematic (TN) liquid crystal switch with an extinction ratio in excess of 25 dB, using a twisted nematic cell with specially angled LC alignment layers.

Pan (U.S. Pat. No. 6,181,846) describes a fiberoptic liquid crystal on-off switch and variable attenuator which operate in reflection mode. This device has a single input fiber and a single output fiber, and selectively directs all or a part of input beams into the output port.

The liquid crystal devices described in the prior art are highly specialized devices tailored to particular applications. Apart from these applications, they do not address the general needs of optical communications networks, or confront the specific problems faced where LC-SLMs are to be used with diffractive Fourier optical systems. The potential that these systems have for very flat passbands, sharp spectral roll-off, low polarization dependence, low adjacent channel crosstalk and low chromatic dispersion should not be diminished to any meaningful extent by the modulation techniques that are used. However, diffraction gratings do not distribute wavelength components uniformly in space, only inputs of arbitrary states of polarization are accepted, and the systems are so physically compact and beam paths so dense that minute variations in alignment or angle can alter operating performance in a negative manner. Furthermore, the liquid crystal cells themselves have unique characteristics which must be taken into account. They are both wavelength and temperature dependent, and their characteristics can also vary with age. Furthermore, their response deteriorates if the incident light intensity is in excess of a given threshold.

Important operative factors that apply to optical communication systems that employ spectrographic filtering arise in meeting passband requirements imposed by the very high and different data rates with which each wavelength may be modulated. The beams which are diffractively dispersed from a DWDM input not only have a Gaussian power intensity distribution about the center (e.g. laser) wavelength but are more widely distributed because of the sideband components. These sideband components must be preserved so that data is not compromised, but at the same time adequate stopband widths must be maintained. These passband and stopband requirements, in addition to the requirements for high efficiency response and linear modulation or full extinction at each wavelength, are not encountered in display and other types of systems that use liquid crystal elements.

Any optical system has what may be called a tolerance budget, representing the cumulative total of the critical alignments that must be observed for the system to function as designed. While many configurations may theoretically be feasible, excessive criticality in components, alignment, or assembly procedures can render a system impractical for production or use.

SUMMARY OF THE INVENTION

Systems and methods in accordance with the invention employ the phase retardation properties of voltage controllable liquid crystal cells in conjunction with polarization diversity optics proximate to the cells to effect controlled attenuation or extinction of individual beams of different wavelengths and initially arbitrary states of polarization. DWDM input beams to be separated into dispersed wavelength components by a diffractive Fourier optics system may be split into separate polarization components before or after wavelength dispersion. Whichever approach is used, the phase retardation introduced by the liquid crystal transforms the polarization of the wavelength component, such that one or more polarization dependent devices are used to reject a predetermined part of the signal at that wavelength. The optical axis or axes of the polarization management optics are in chosen relation to the alignment axis of the liquid crystal and, in some instances, to the polarization direction of the wavelength components. Separate polarization components for each wavelength may be superimposed, to be coincident on the liquid crystal surface, or they may be separate, but in any event the beam spots are distributed over a sufficiently large area to keep the local light intensity below a deleterious threshold throughout the area. The liquid crystal cells may be reflective or transmissive, and zero twist nematic or twisted nematic, although the zero twist nematic, reflective type is generally used for a compact diffractive Fourier optics system in which a linear attenuation range is a primary performance characteristic.

Beam polarization separation and recombination can be effected before and after diffractive dispersion recombination in an optical system where signals at denser channel spacings (e.g. 25 GHz) are being modulated or blocked. The polarization dependent components can be polarized sheets or plates, or polarization beam displacers, in reflected or transmitted beam paths.

In a more specific example in accordance with the invention, polarization components are split prior to initial wavelength separation of the beam, as by a Wollaston prism beamsplitter system which diverges the polarization components of the DWDM beam by a small separation angle. Both components are then propagated in close adjacency through multiple folds in the diffractive Fourier optics system and the beams are directed such that dispersed individual wavelength components converge as separate polarization components toward a liquid crystal array at a focal plane. The wavelength components are asymmetrical, being narrow and separate but closely adjacent in the sagittal direction, but of more than an order of magnitude longer in the transverse direction, with the polarization components forming separated beam waists of like polarization direction at the liquid crystal. The liquid crystal cells are zero twist nematic cells which have optical axes in a selected relation to the polarization direction of the beam components, such that they phase retard the incident beams to an extent determined by individual control signals at each cell. The reflected beams diverge at a low separation angle with, in general, elliptical polarization at some azimuth angle, which determines the percentage of signal to be rejected by adjacent polarization dependent elements, the rejection being affected by absorption or diversion. The two polarization component beams thereafter return reciprocally through the prior three dimensional folding paths for the polarization and wavelength components to be recombined, providing the modified DWDM signals.

Advantageously, using an SLM array of elongated LC cells, asymmetric, diffraction limited beam spots are formed having transverse dimensions in the range of 200–250 microns with the $1/e^2$ optical intensity of the carrier wavelength having a sagittal distribution in the range of 8–11 microns, and extending further sagittally because of the sideband components. The optical paths into the polarization management system are disposed such that the separate polarization components converge at slightly different angles to meet on the LC-SLM surface, and then reflect, switching paths as they return. Beam components that are rejected may be blocked by a polarizing plate or sheet of proper alignment, or alternatively be diverted by one or more polarization beam displacers (PBD). to an energy diffusing surface or to a separate return path.

Each pixel surface area is defined by its LC cell boundary, which is bordered by an interpixel gap that serves as a barrier to the adjacent pixel area. By employing a sagittal pixel width that is sufficient to accommodate the broadened sagittal width of the incident wavelength beam that has been modulated at a high data rate, the full optical intensity spectrum at that wavelength is modulated and reflected with high efficiency. By maintaining a chosen relationship between the pixel width and interpixel gap width, both the passband width and the stopband width characteristics needed for high performance are attained.

An alternative arrangement of polarization management and beam power control using liquid crystal cells in an SLM array may be advantageous at wider channel spacings. In this exemplification, the beam shapes are symmetrical or moderately asymmetrical, and the beam polarization components are separated after dispersion of the wavelength components at the first of a pair of polarization beam displacers. The optical axes of the PBDs are angled diagonally relative to each other and the alignment axes of the liquid crystal cells. The control voltages applied to the liquid crystals again determine the ellipticity and azimuth of the reflected beam components, so that the PBDs separate the signal components from lossy components that are to be rejected. Rejected components are diverted from the useful field of view, while the individual wavelength signals return through the beam refolding system to recombine as the modified DWDM signal.

Systems in accordance with the invention, which employ a shared input/output collimator and multiple forward and reverse refolding of beams along substantially equal focal length paths, are advantageous in that they are tolerant of small collimator misalignments. Coupling efficiency is maintained at a high level because pointing errors of the input beam are identically tracked by the output beam.

The polarization management optics can be configured in relation to the input/output optics of the diffractive Fourier optics system to employ the tight three-dimensional refolding capability of the system for greater application diversity. Thus a double collimator device, with collimators at closely spaced elevations, may be used together with polarization diversity optics which utilize a series of polarization beam displacers to reflect beams at either of two elevations, with an elevation difference corresponding to the input collimators. This system may be used, with individual cell commands, to provide interleaver, block switching, add/drop and other functions.

The responses of nematic liquid crystals are linearized in response to different operating conditions by using look-up tables or other reference data to correct for wavelength, temperature and other disparities. In the present system this may be further supplemented by employing a test cell in the array, and testing the capacitance of that cell, which provides data needed not only for temperature, but for aging as well as other parameters.

The stringent performance demands of modern optical systems are also met by use of specific designs and adjustments that minimize aberrations. PDL is minimized, for example, by the use of different but symmetrical polarization component beam paths which are superposed at the liquid crystal surface. High extinction values are attained by precisely (to less than 0.1°) aligning the optical axis of a polarized plate relative to the optical axis of a quarter waveplate interposed before the LC, which also ensures full transmission in the power-off condition. Chromatic dispersion is reduced by positioning the LC in the Fourier plane of the diffraction grating so that the forward and backward propagation are nominally identical in amplitude and phase profile for each individual wavelength signal. A Wollaston prism beam splitter is of benefit in assuring suitable separation and alignment of the polarization components. Multipath interference, group delay ripple and other performance factors affected by back reflections are minimized not only by the use of antireflection coatings, but also by tilting of entrance and exit surfaces on components to reject spurious reflections arising from surfaces in proximity to the liquid crystal modulator plane.

In another example of a multi-beam modulating system for providing gain or channel equalization of a DWDM signal, the liquid crystal array is subdivided along its axis into a multiple pixel per channel format. For example, the pixel pitch may be less than 2 microns, with many (e.g. 4096) pixels for an 80 channel wavelength dispersed DWDM beam. Zero twist nematic LCs forming a pixel cell array along a sagittal plane have their optical alignment axes oriented parallel to the sagittal direction. The sagittally distributed beam spots representing different wavelengths are incident across the entire array. The beam spot widths are substantially greater than the individual pixel widths and inter-pixel spacings, with $1/e^2$ optical impulse values within each beam spot thus being distributed over a number of pixels. The pixels are individually modulated, and the LC-SLM provides a smoothly distributed response that can be used in gain equalization applications and advantageously to tailor amplitude variations within channel passbands themselves.

Polarization diversity optics operating to provide beam control at different elevations can be used with compatible input/output structures to enhance the versatility of diffractive Fourier optics systems using three dimensional refolding. For example, different input and/or output DWDM beams that are spaced apart by millimeter-sized elevation differences can be communicated into and out of the diffractive Fourier optics system which separates and recombines the wavelength components in reciprocal refolding sequences. In the process, the individual wavelength signals may be separated by polarization diversity optics into separate polarization components which are incident at different elevations on an LC-SLM cell operated, for example, in fill extinction or full transmission mode. Dependent on the transformation used at an individual cell, the return output beams are at one of two elevation levels corresponding to the input/output differential. This enables the system to provide, in response to an input DWDM beam, separate express/drop outputs, and interleaver capability, or band splitting operation. This approach also is advantageously used with beam polarization splitters disposed between the input/output elements and the diffractive Fourier optics system, and superimposing convergent polarization components on each cell of a reflective zero twist nematic LC-SLM. In this example, the polarization diversity optics directs both polarization components back to the diffractive Fourier optics system at differential elevations such that, dependent on the transformation used at the LC cell, the wavelength signal is recombined with like-transformed other wavelengths at the appropriate signal path.

BRIEF DESCRIPTION OF THE DRAWINGS

A better understanding of the invention may be had by reference to the following description, taken in conjunction with the accompanying drawings in which:

FIG. 12 is a combined block diagram of the arrangement of a diffractive Fourier optics system together with a double collimator and a beam control unit that provide separate output beams from the system;

FIG. 13 is a combined block diagram of an arrangement that is an alternative to that of FIG. 12;

DETAILED DESCRIPTION OF THE INVENTION

An understanding of the diffractive Fourier optics system 10 which delivers individually dispersed wavelength components for separate control is desirable in order to appreciate the context for the beam control unit. This system operates with high optical resolution and relatively low aberrations and distortions, and is particularly suited for systems with smaller channel spacings, as in the range of 25, 50 and 100 GHz. These optical systems are designed to achieve polarization independent optical performance despite the fact that polarization dependent components are used. These polarization dependent components include LC-SLMs and potentially, high ruling density diffraction gratings. The optical systems described below therefore include novel polarization diversity optics and LC-SLM's to provide enhanced optical performance in a fashion that is polarization independent with respect to input beam characteristics.

Single Elevation Optical System Utilizing Polarization Dependent Diffraction Gratings Optical beams can be launched at one or more elevations into the diffractive Fourier optical system. This enables multiple input/output functionality to be potentially achieved. First, the single elevation optical system will be described, one which shares a common input and output. For many applications, this approach has advantages arising from the self-alignment nature of the optical system, in which the output beam automatically tracks the input beam spatial and angular position. This significantly improves the manufacturability and stability of the device.

Figure 1:
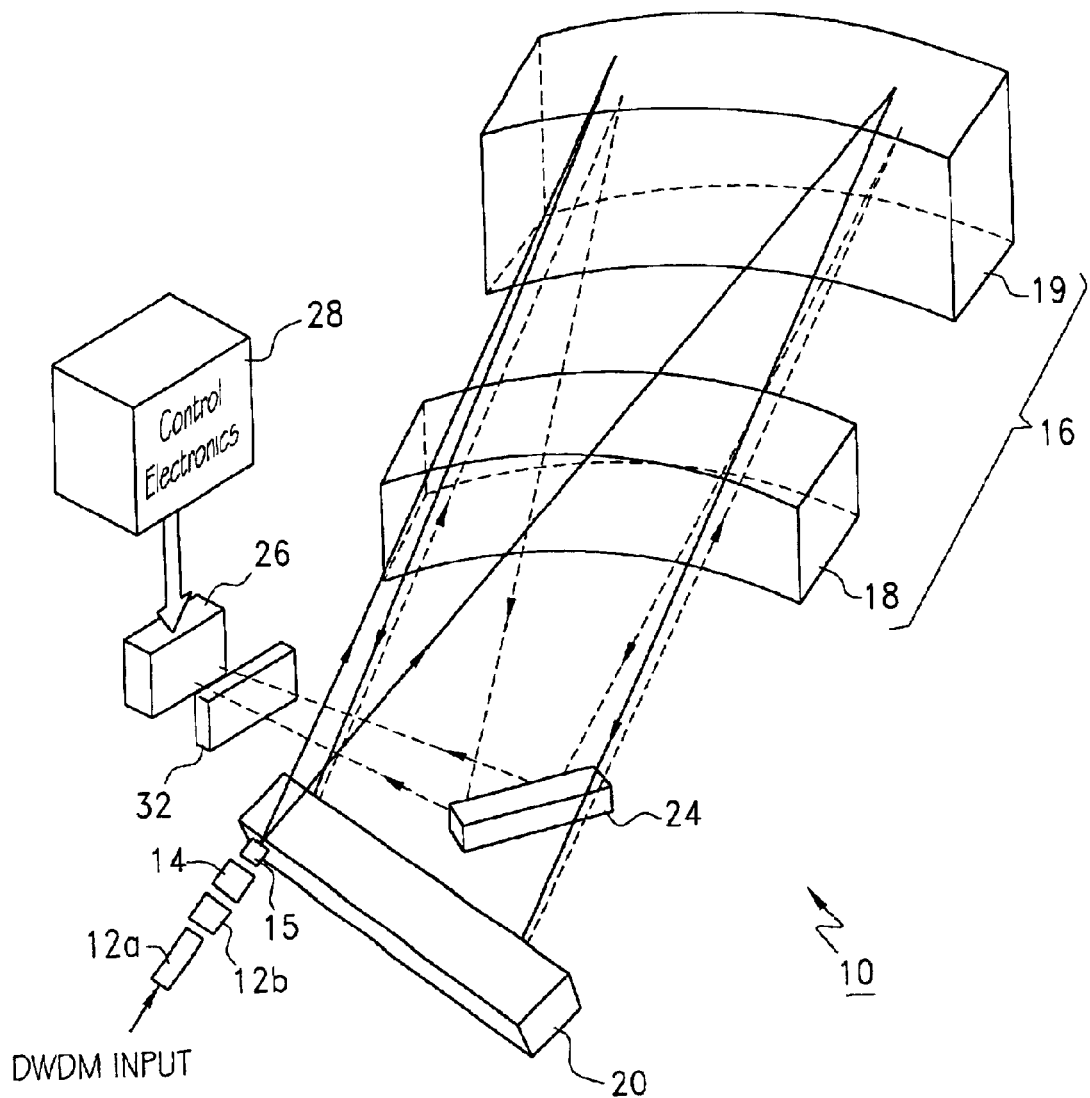
FIG. 1 is a simplified schematic view of a diffractive Fourier optics system including a beam control unit in accordance with the invention, with the beam control unit relatively enlarged for clarity.
Figure 2:
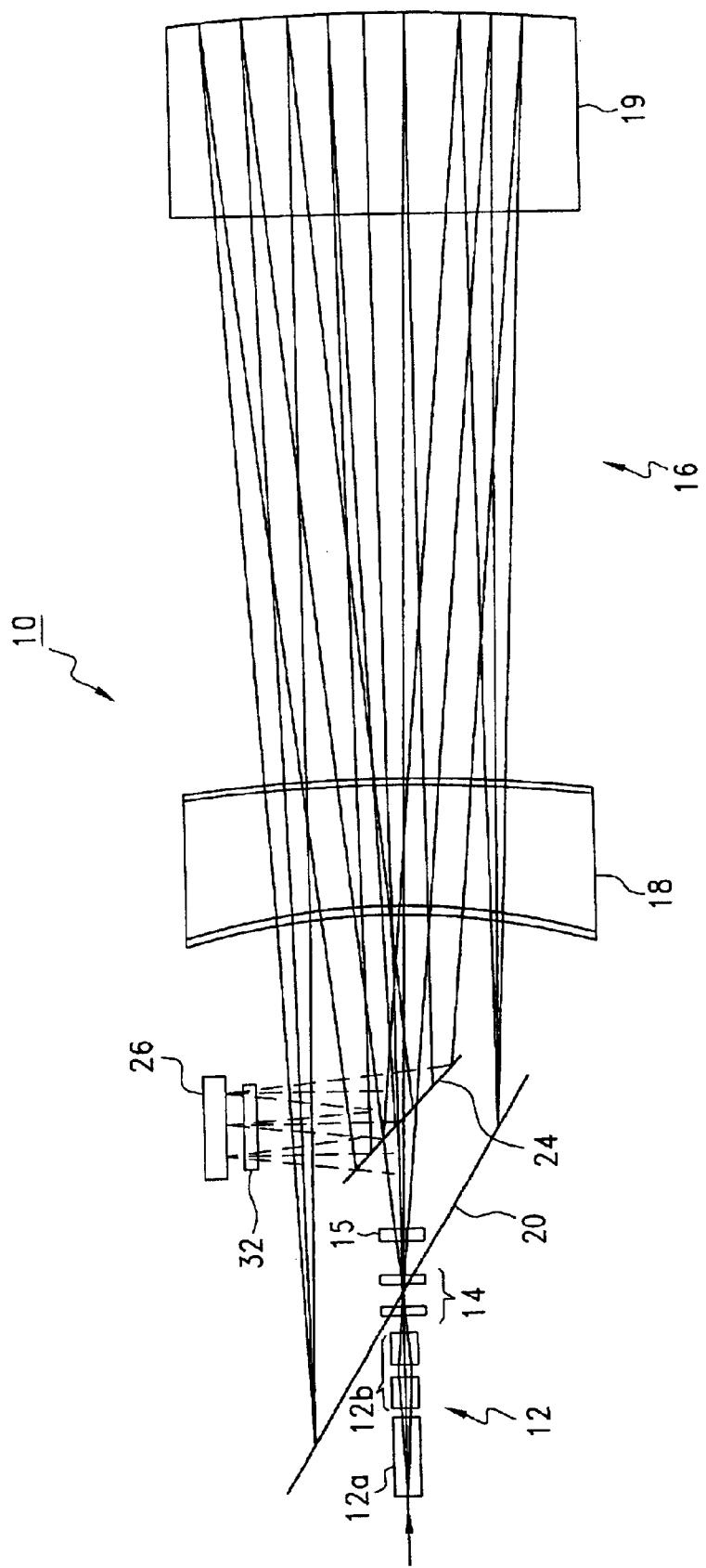
FIG. 2 is a top schematic view of a diffractive Fourier optics system and beam control unit showing the disposition of the principal optical elements of a practical exemplification and generally depicting the beam paths therein.
Figure 3:
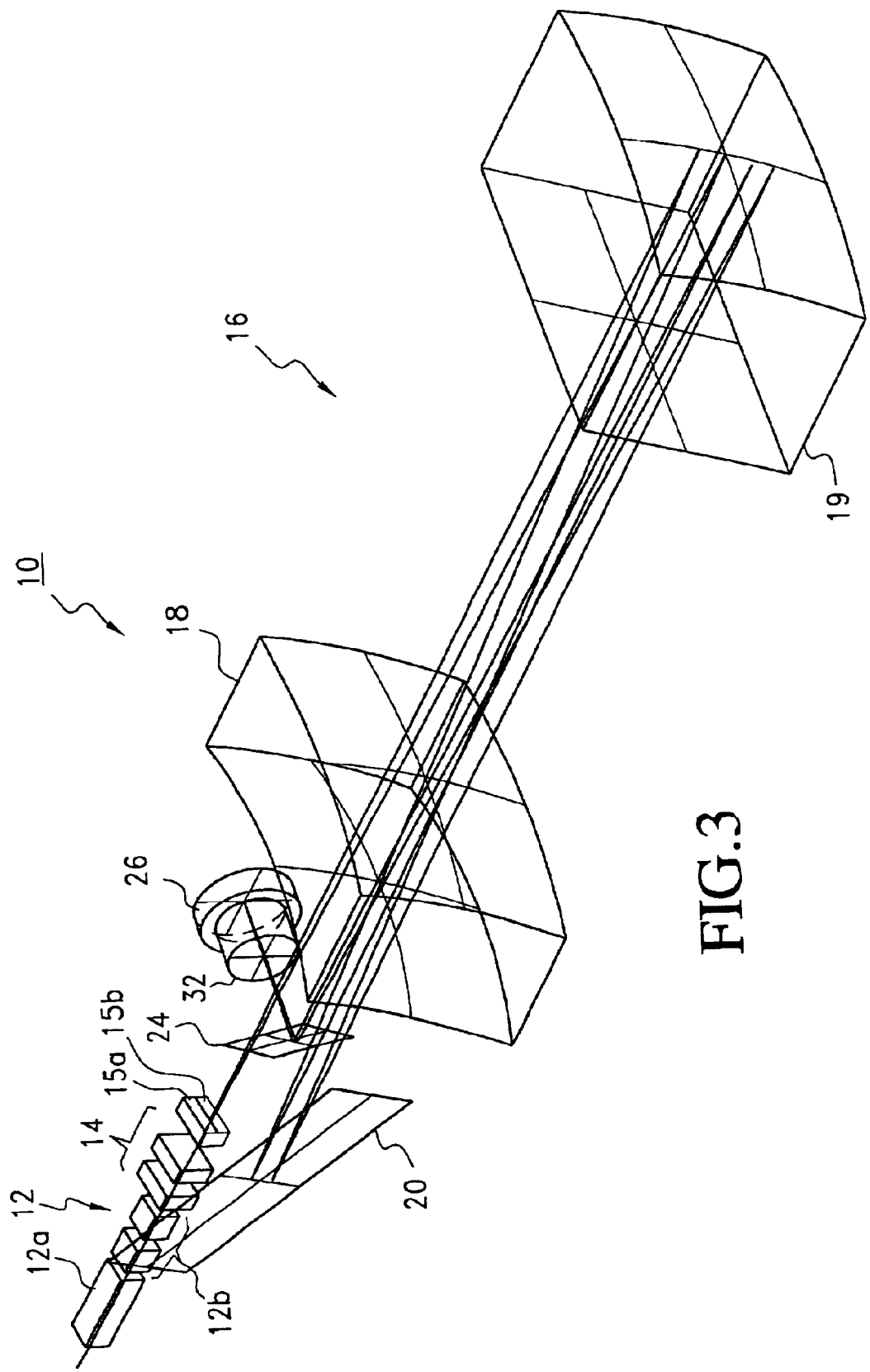
FIG. 3 is a perspective schematic view of the system of FIGS. 1 and 2, showing the sagittal positions of beam centers for separate polarization components as the beam paths propagate through the diffractive Fourier optics system to the liquid crystal cells of an SLM array.

Referring now to FIGS. 1–3, the input device 12 comprises a single collimator 12a receiving a DWDM beam of arbitrary state of polarization from an optical waveguide (not shown) and a serially disposed anamorphic converter 12b which reshapes the collimated input beam into an anamorphic pattern with substantially greater sagittal width than transverse height in the approximate range of 20:1 or more. From the anamorphic converter 12b the beam passes parallel to a central axis (as best seen in the top view of FIG. 2) towards a slightly lower elevation through a beam polarization splitter 14, which may advantageously be a Wollaston-type splitter that provides s and p polarization component beams of orthogonal orientation diverging at a small angle. This beam splitting is depicted in the perspective view of FIG. 3, but is not to scale, since the angle of divergence between the different polarization components is less than 2° and in one example the beams diverge only ±0.5° from a nominal center line. The beam polarization splitter 14 feeds the diverging signals of s and p polarization through an adjacent polarization rotator 15 which includes (FIG. 3) a half waveplate 15a for rotating only the p polarization component into alignment with the s polarization component, and a transmissive optical element 15b in the s component path for equalizing the path lengths for low PMD. These polarization components of parallel direction of polarization will be referred to as s and s' components.

The input beam at this point comprises the two polarization component beams of like polarization direction moving in close adjacency throughout the beam refolding system 15. For simplicity and clarity in FIGS. 1–3, a hermetic housing about these elements and associated mechanical and electrical components have not been included, to better depict the three dimensional but tight beam refolding paths which use different elevations of beam reflection in shaping, diffractively separating, and focusing the separated components. However, it can be seen that the beam refolding system 15 comprises a diffractive Fourier optics system having a mirror system 16, termed a Mangin mirror, as one terminus. Here the Mangin mirror system 16 introduces precise corrections and beam angle changes through use of a first lens 18 which is wholly transmissive and a second lens 19 which has a back reflecting surface, each having two spherical surfaces. The slightly descending optical path from the input is thus directed through the Mangin mirror system 16, being reflected back parallel to the control axis toward the input side off the rear surface of the second lens 19. While the central axis is quite accurately depicted in FIGS. 2 and 3, the beam paths in FIG. 1 are not precise relative to the central axis, in order to show the three dimensional beam folds and shapes more clearly. The top view of FIG. 2, while not to scale, can on close inspection be seen to illustrate some refractive corrections made by the Mangin lenses, 18 and 19.

The split polarization component beams are depicted only in the perspective view of FIG. 3. The optics of the Mangin mirror 16, as described more fully in the currently filed application, collimate the diverging anamorphic but low profile input beam in the sagittal and transverse directions. The beam patterns projected onto the mirrored surface of the Mangin mirror 16 are in this example only about 1 mm in transverse dimension, and the two beam polarization components have only about 1 mm spacing between them. While correcting aberrations, the Mangin mirror 16 also tilts the beam downwardly slightly toward a lower level onto a reflecting diffraction grating 20 positioned at a second focal plane of the reflecting optical system.

The diffraction grating 20, which again reflects the beam pattern back parallel to the central axis, lies along a sagittal plane and is disposed at the Littrow angle for 1547 nm, here 58.2° to the central axis. This 1547 nm wavelength is the center wavelength of a spectral band chosen as a practical example. The grating period is a dense 1100–1200 lines/mm, and the grating may be holographic or ruled. This very dense grating pattern is polarization dependent, but both s and s' polarization components are now in the s polarization orientation and perpendicular to the grating lines, which can be tilted up to 2° in its outer region relative to the center. In addition the collimated beam illuminates substantially all of the grating lines of the diffraction grating 20, in the sagittal direction, providing high optical resolution with a diffraction efficiency of greater than 90%. The diffraction pattern reflected off the diffraction grating 20 disperses wavelength components between parallel beam boundaries in a composite beam, returned through the elements 18, 19 of the Mangin mirror system 16 to the reflective back surface of the second lens 19. These reflected patterns, now at a slightly lower plane, again comprise the two closely adjacent polarization component beams, again about 1 mm tall with about 1 mm separation in elevation.

When reflected back again from the Mangin mirror system 16, the dispersed wavelength components are now individually converging, in both the sagittal and transverse directions. They are also convergent to form sagitally separate wavelength dependent beam waists at a focal plane. The focal length of this final path is approximately the same as the nominal beam path lengths between the diffraction grating 20 and the reflective back surface on the second Mangin lens 19. Before the focal plane and at a level below the grating 20, the converging beams are diverted horizontally at a pickoff mirror 24 toward a focal plane positioned out of the principal beam paths, as best seen in the top view of FIG. 2. At this position the convergent beams are incident on the individual elements of an LC-SLM array 26, depicted generally in FIGS. 1 and 4. Diversion of the converging dispersed wavelength components in the final beam path from the Mangin mirror can be in the transverse direction as well as the sagittal. Thus the pickoff mirror may conveniently be positioned to angle the wavelength components down onto the surfaces of cells in a horizontal LC-SLM array.

The LC-SLM array 26 has, in this example, eighty to one hundred closely spaced cells 27 (FIG. 4), each separately operated in individual fashion by control electronics 28 (FIG. 1). The cells 29 are disposed along a sagittal plane and are defined and separated by smaller interpixel gaps 30 (FIG. 4) within a cell body as described below with relation to FIG. 5. The interpixel gaps are typically about 3 $\mu$m in width, and the cell center-to-center spacings vary from 75 to 95 $\mu$m along the array direction, in a chirped fashion. The chirp is selected to effect proper alignment between the channel centers lithographically defined on the LC-SLM and the standardized ITU wavelength channels. The front windows 37 of the cells 27 are made more clearly evident by omitting from FIG. 4 some intervening elements such as a number of optical elements shown in FIG. 5 and described in connection therewith. Also, to show entry and exit angles the sagittal widths of the beams do not include sideband components which broaden the sagittal distribution in a complex manner. Essentially, the sagittal aspect of the beams represents graphically the $1/e^2$ optical intensity of an unmodulated wavelength component at its appropriate pixel, of 8–11 microns in this example, in contrast to a transverse dimension of 200–250 microns. Each of the cells 27 individually receives an asymmetrically shaped, separate wavelength beam comprising both beam polarization components. These beam components are directed slightly downward through a polarized plate or sheet 32 at converging angles of 3° and 2° so as to be superposed, at their beam waists, on the cell 27 face. Because the incident beams cover a substantial area of the face of the liquid crystal cell 27, the local power intensity is not at any local region in excess of 200 W/mm$^2$, so that a threshold at which signal distortion occurs is not reached. After reflection, the desired fraction of the beams return to the diffractive Fourier optical system, reversing paths at 2° and 3° upward angles in doing so. The undesired beam components are directed downward, upward, or absorbed by plate 32, to provide the desired level of attenuation.

Spurious reflections off the antireflection coated faces of the optical elements are small, and are further diverted off from the paths of the signal beams by tilting the optical faces. All optical interfaces having an index mismatch of greater than 0.1 are antireflection coated. Advantageously those surfaces in the vicinity of beam waists (<1.5 mm at the focal plane) are tilted greater than 5° to sufficiently reject (i.e. >55 dB rejection) these reflections, to maintain suitably low levels of multipath interference, group delay ripple and transmission ripple. Because both components are polarized in the same polarization direction, the optical axis of an adjacent polarized plate or sheet 32, here of "Polarcor" is at 90°, while the optical axes of the liquid crystal cells 27 are at 45°.

Figure 4:
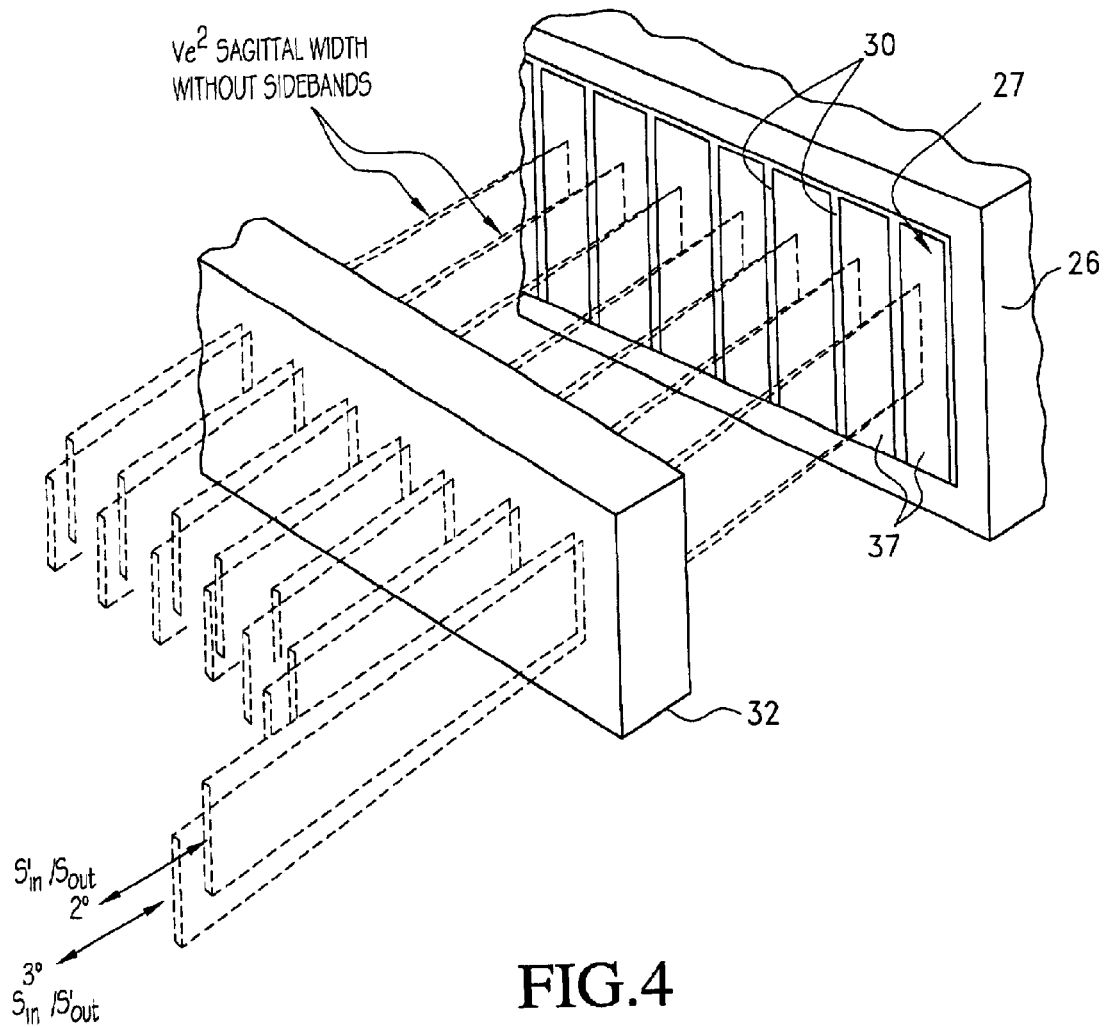
FIG. 4 is an enlarged perspective but simplified fragmentary view of an example of part of an individual polarization dependent device with a number of reflective liquid crystal cells, showing the beam paths directed to and reflected from the cells in the system of FIGS. 1–3 with beam shapes being idealized with narrow sagittal dimensions corresponding to $1/e^2$ power intensity distributions that would exist for beams with no sideband components.
Figure 5:
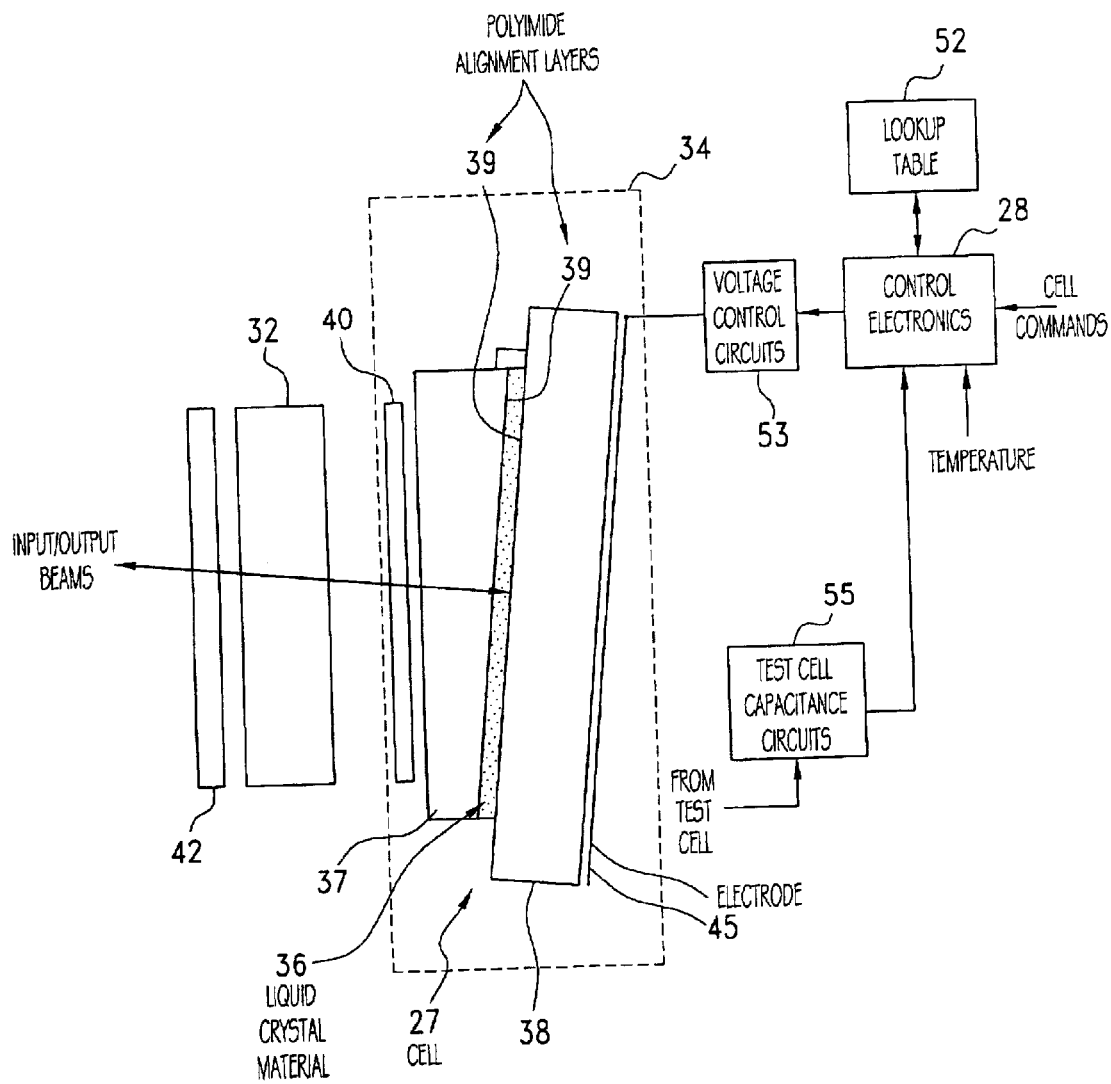
FIG. 5 is a side sectional fragmentary view of a single pixel control, including polarization diversity optics in relation to a cell of an LC-SLM, together with a block diagram of control circuits that may be used to compensate for non-linearities in signals in an LC array.
Figure 6:
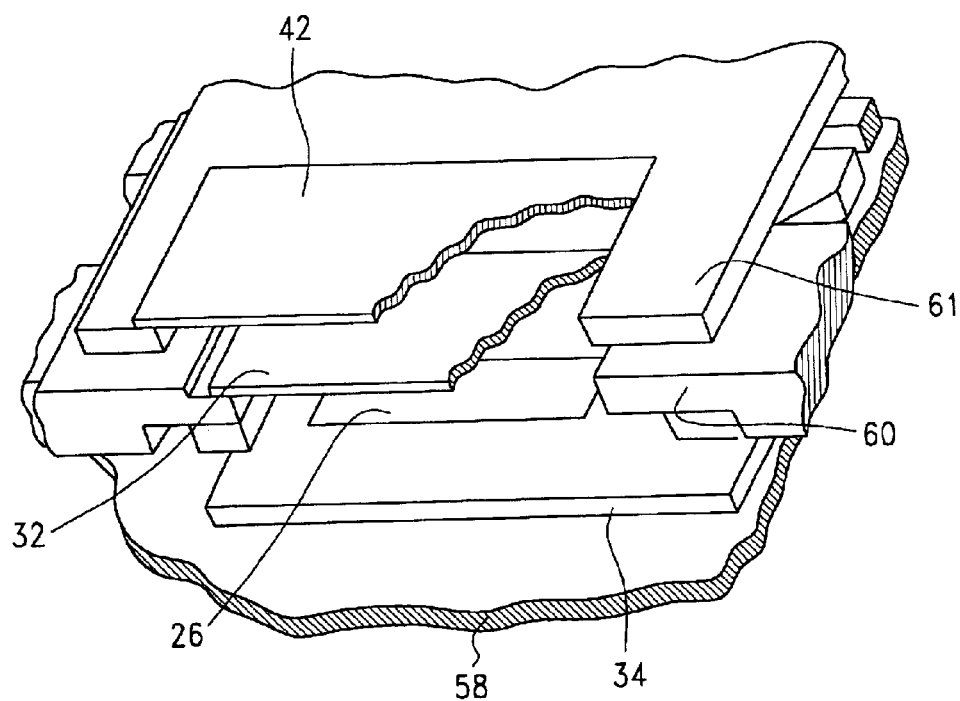
FIG. 6 is a perspective fragmentary view, partially broken away, of one practical exemplification of polarization management optics and liquid crystal cell array in accordance with the invention.

Referring particularly to FIGS. 4, 5, and 6, the liquid crystal cells 27 are of the zero twist nematic type, and function both as $\pi/2$ phase retarders for signal extinction, and controllable phase retarders and polarization transformers for signal attenuation. Zero twist nematic cells are useful for both functions, since they can provide >45 dB extinction and are operable for attenuation functions with approximate linearity in response to voltage over a 0 to 20 dB range. The cells 27 are each, in this example, about 3 mm high (transverse to the sagittal plane) and about 75–95 microns wide, with small interpixel gaps 30 of about 3 microns. The polarized beam components which are incident on the cells 27 are asymmetrical, being elongated in the direction transverse to the sagittal, although the direction of polarization is sagittal. Sagittal beam spreading at the wavelength dispersive focal plane is primarily due to the sidebands introduced by data rate modulation.

Referring now specifically to FIG. 5, the cell body 34 for each cell 27 encloses a liquid crystal material 36 between a transparent (i.e. glass or silica) planar or wedge-shaped front window 37 and a reflective surface on the rear of a back window 38. Both facing surfaces of the windows 37, 38 are covered with alignment layers 39, 39' typically composed of polyimide. The alignment layers 39, 39' are rubbed in anti-parallel senses to impose surface patterns of given linear orientation, called the director, which defines the optical axis of the liquid crystal cell 27, here at 45°. The liquid crystal body 34 optionally is fronted by or incorporates a quarter waveplate 40 which is used to introduce a constant phase delay in reflected beams such that if power failure occurs and the driving voltage is zero, then the unit is fully transmissive to enhance the robustness of the overall network operations. The "Polarcor" plate 32 is aligned at nominally 90° to the vertical, parallel to the input polarization direction. A half wave plate 42 may be interposed in the beam path before the Polarcor to rotate the input state of polarization to either 90° or 0° and correct for slight tilt of the polarization direction resulting upon diffracting from the grating.

FIG. 6 shows the elements and relationships in the geometry of a practical beam control unit assembly, in which the cell body 34 is supported in a base 58 over which are superimposed successive frames 60 and 61, which respectively retain the input half waveplate 44, and the "Polarcor" plate 32 respectively. It should be understood that these elements each span all the cells of the LC-SLM array 26 on the base 58. The total sagittal dimension of the active pixel array is only of the order of 8.5 mm long. This assembly is thus fully compatible with a diffractive Fourier optics system that is of the order of 1000 cc or less in volume.

Alignment Methods for High Extinction

Precise positioning of the birefringence polarization diversity optics and the LC-SLM are used to achieve high extinction. By using a fixed reference polarizer during assembly and monitoring the state of polarization of a probe beam (90°) as optical elements are placed in the assembly, the angles of the optical axes can be closely controlled. Here the "Polarcor" plate 32 is aligned so that its optical axis is at an orientation of 90° and the input half waveplate 42 is also to be at 90° and this alignment can be ascertained to necessary precision using the probe approach.

In order to enhance extinction levels, care is taken in internally aligning the components relative to the slow axis orientation of the LC-SLM assembly, with the optional quarter waveplate (and any compensator used to cancel residual birefringence) being set at 180°±0.5° to the slow axis of the liquid crystal. It is at least of equal importance to align the polarization management optics precisely relative to the quarter waveplate/compensator axis so as to provide maximum extinction.

In FIG. 5 the control electronics 28 are depicted generally, in relation to the voltage control circuits 53 which are coupled to a control electrode 45 disposed on the rear window 45 of each cell 34. The LC-SLM array may consist of a common back window 38 on which control electrode 45 patterns are distributed for individual control of the LC cells. When a command signal indicates that an input beam at a given wavelength is to be extinguished or selectively attenuated, the control electronics 28 utilize inputs from temperature sources, known wavelength data, and potentially from the test cell capacitance circuits 55, other conventional reference sources or external feedback sources (e.g. channel monitors, etc.) to translate the set point value into a signal for the voltage control circuits 53 for the cell by referring to a lookup table 52, by the use of which a linearized response can be assured. The test cell input may also indicate whether and what corrections are needed for aging effects, resulting from ion drift or alignment layer aging within the liquid crystal cell, for example.

The input beam, because of the parallel orientation of the optical axis of the polarized plate 32, relative to input polarization is not attenuated until after reflection and phase retardation by the voltage controlled liquid crystal cell 27. Full extinction in excess of 45 dB is introduced if the phase retardation is set by the control electronics 28 (FIGS. 1 and 5) to a level introducing the desired degree of attenuation. The transformation of polarization components results in blocking of a predetermined proportion of the reflected beam by the polarized plate 32, to equalize channels or gain in this example. Optionally, a small tilt may be introduced in the surface of the liquid crystal rear window 38, as by a 0.5° wedge, to prevent undesired reflections from propagating backwards along the beam paths.

After reflection of the transformed and attenuated components at each cell, referring again to FIGS. 1–3, the separated beam polarization components are amplitude modulated, or extinguished, and are refolded in reciprocal paths through the system comprising the Mangin mirror 16 and the diffraction grating 20. When they reach the half waveplate rotator 14a which receives the previously rotated s' polarization component, positioned immediately prior to the anamorphic converter 12b and the collimator 12a, they are returned to the orthogonal relationship of s and p polarizations, again with equal optical path lengths being maintained. This equal path length condition is maintained by translating the Wollaston prism up or down within the plane defined by the entrance and exit beams. The ensures that orthogonally polarized beam 1 and beam 2 each propagate through identical lengths of crystal and air; that is, that the condition $L_{wedge1,beam1}\ n_c + L_{wedge2,beam1}\ n_o + L_{air,beam1} = L_{wedge1,beam2}\ n_c + L_{wedge2,beam2}\ n_o + L_{air,beam2}$ is satisfied. Note that by incorporating a half wave plate 90° rotator followed by a second Wollaston prism, the path length matching condition is satisfied for all beam elevations, assuming the two prisms are precisely and properly aligned to one another. This approach may be advantageous for the dual elevation designs described below.

Consequently, with the dispersed beams having been rediffracted off of the diffraction grating 20 and then converged back to the input after returning through the Wollaston prism, the modified DWDM beam with channel equalization and/or blocking has been fully recombined with polarization direction restored for transmission. The returned DWDM beam can be directed to a different elevation adjacent the input region, or the output signal can be separated by a circulator in the input path.

Figure 7:
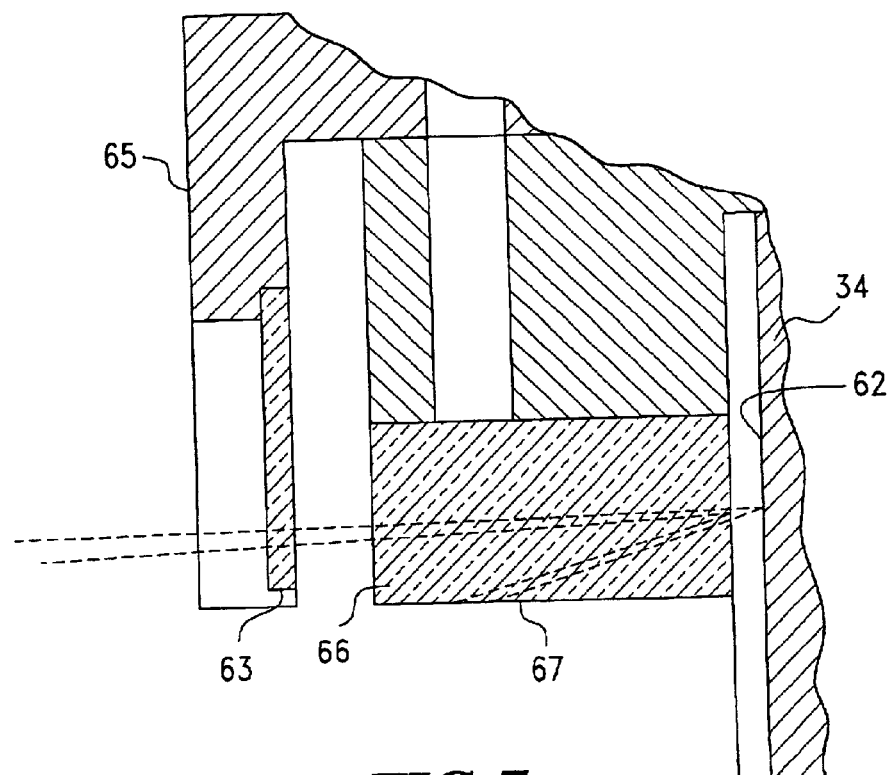
FIG. 7 is a side sectional fragmentary view of an alternative beam control unit that may be employed with the system of FIGS. 1–4.

In the example of FIG. 7 polarization diversity optics are also disposed adjacent the reflective cell faces 62 on a cell body 34 held in a frame 65, but the beam is first transmitted through a half waveplate 63 oriented at an angle which rotates the input polarization into precise 90° alignment, then transmitted through a polarization beam displacer 66 with its optical axis angled at 0° to incoming polarization components, and at 45° to the alignment axis of the cell 27 in the cell body 34. The azimuth angle and ellipticity of the beam polarization after transformation by the reflective LC cell determines the proportion of rejected energy diverted from the signal path by the PBD 66. The diversion of off angle components after transformation by the cell 27 can be angled to take these components out of the field of view of the returned signal components. Alternatively the diverted components may be directed to a side surface of the PBD 66, as shown. The energy in the diverted beam may be substantially reduced in local intensity by a light diffusing surface 67 on the side wall on which it is incident.

Single Elevation Optical System Utilizing Polarization Independent Diffraction Gratings In practice, polarization dependent diffraction gratings with a high density of rulings enable higher resolution filtering than polarization dependent diffraction gratings, within a given form factor, by virtue of their increased angular dispersion. The use of polarization dependent gratings is of significant benefit for systems with close channel spacings, but in other systems, (e.g. 100 GHz channel spacings) the polarization management function may be treated as effectively by utilizing polarization independent gratings, such as those with about 600 rulings/mm density.

Figure 8:
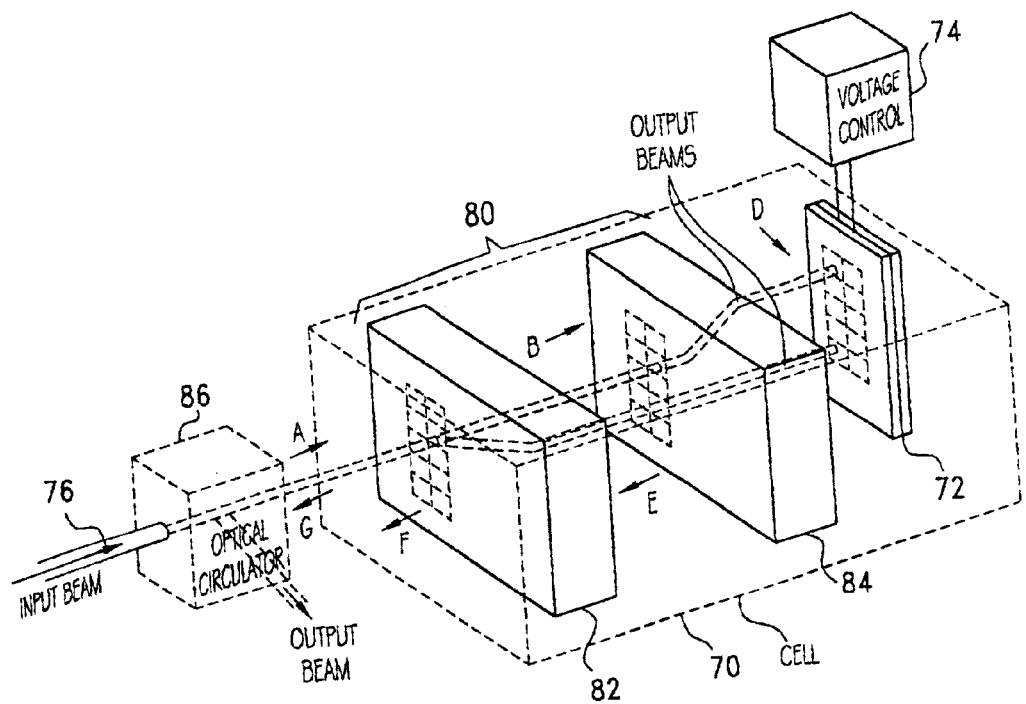
FIG. 8 is a perspective view of another polarization management and liquid crystal control arrangement, illustrating an individual cell of an array and a beam control unit which are responsive to a single dispersed wavelength component from a diffractive Fourier optics system.
Figure 9:
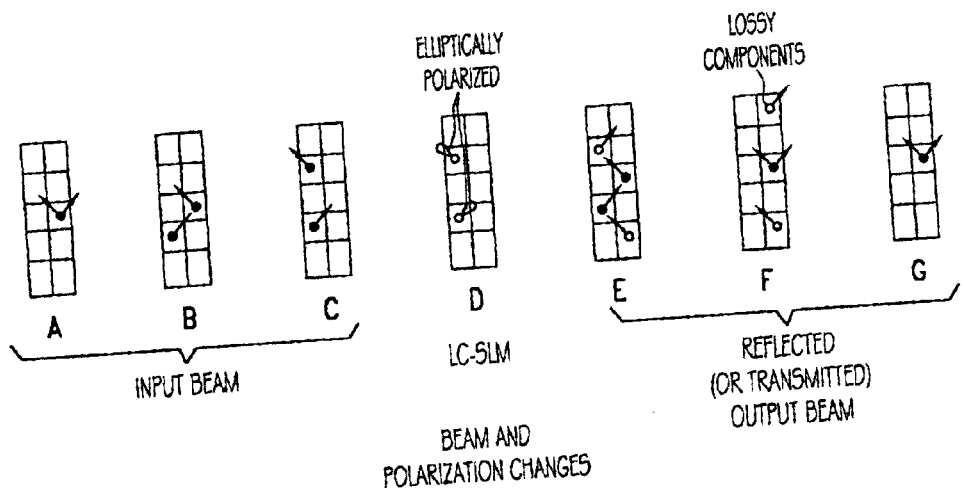
FIG. 9 is a diagrammatic view of a number of grids, A through G, with successive beam displacement positions and polarization directions, to depict successive beam changes in passing through the beam control unit optics of FIG. 8 before and after modulation by an LC-SLM cell.

FIGS. 8 and 9 depict, generally, a single pixel cell 70 of a beam control unit receiving a single symmetric or asymmetric (i.e. round or oval) cross-section single wavelength beam for equalization, blocking or some other function. Note that the Wollaston prism and waveplate array are not used in this example to account for the polarization dependence of the grating, as they were in the previous example. The beam polarization incident on the beam control unit is now arbitrary. The cell 70 is not drawn to scale since in practice it is of 10 to 100 microns in width, with a patterned variation in the width of each pixel for centering of sagittally dispersed wavelengths. The cell 70, as in the above examples, comprises part of an LC-SLM array and is a zero-twist nematic liquid crystal 72 which variably retards the impinging beams, as determined by its voltage control 74. The input beam 76, with an arbitrary state of polarization, is directed from a diffractive Fourier optics system (not shown) into the polarization management optics 80, in which a first polarization beam displacer (PBD) 82 separates the single input beam of a specific wavelength into two orthogonally polarized beams traveling along parallel paths. These then pass through a second PBD 84, wherein the beams are further separated while at the same time the optical path lengths are equalized. The PBDs 82, 84 are typically birefringent crystals, such as $YVO_4$ crystals, approximately 2 mm thick and, as above, extending across all the LC cells. The first PBD 82 is at a 45° angle in a first sense relative to a lateral or X axis, while the second PBD 84 is at a 45° angle in the opposite sense relative to the X axis, therefore at 90° relative to the first PBD 82. These polarization beam displacers 82, 84 not only provide polarization independent operation but polarization path length matching with a minimum of parts. Diagonal displacement PBD's avoid the necessity for intermediate polarization rotators, thus minimizing the parts count.

The optical path lengths from the input of the cell 70 to the plane of the liquid crystal should be precisely matched for the two polarizations transmitted through the polarization management optics 80, so that both polarizations produce wavefronts at the precise focal plane of the LC cell 72. The matched path lengths also insure zero polarization mode dispersion (PMD) operation.

The first PBD 82 splits the non-polarized input beam into two separate orthogonal and linearly polarized beams traveling parallel to one another but slightly displaced along a 45° diagonal. This displacement is approximately 200 microns for a 2 mm thick $YVO_4$ PBD. Since the two polarization components each travel different distances within the PBD, the second PBD 84 is used to equalize path lengths and maintain zero net PMD. The angle of the second PBD 84 is such that the beams vertically separate in accordance with polarization components, and compensate any polarization dependent path length mismatch, since both PBDs 82, 84 are essentially of precisely equal thickness.

To maintain high extinction, the optical axes of the first and second PBDs 82, 84 are aligned to better than 0.5° of 90°, and the LC-SLM 12 is aligned to within 0.1° of 45° with respect to the second PBD 84. The LC cell 72 controls beam attenuation by converting the linearly polarized input beams into elliptically polarized beams of controlled ellipticity and azimuth, which are then attenuated in accordance with ellipticity and azimuth angle when propagating through the remaining polarization management optics.

To minimize coupling of undesired Fresnel reflections from the LC-SLM subassembly, each PBD 82, 84 is mounted at an angle greater than or equal to 0.5° to the input beam propagation direction to insure that surface reflections are not coupled back into the input. Surface reflection effects at the LC cell 72 are reduced by employing a wedged front window.

After reflection off the LC cell 72, the two beams trace identical return paths and are recombined by the polarization management optics 80, to be directed as a single beam back into the input beam location, via any diffractive Fourier optics or other system (not shown in FIG. 8). The reverse directed modified beam is redirected along the input beam path, whereupon it can be separated off the input fiber onto an output fiber by an optical circulator 86.

This system uses displacements along two orthogonal directions, herein called the vertical and horizontal directions, using the labeling shown in the succession of beam position grids depicted in FIG. 9. At the input to the first PBD 82, the single beam is at a mid-height, right-side position, as shown in Grid A, with the polarization components being indicated by the arrows. The first PBD 82, however, splits the beam into two, with one orthogonal beam component shifted vertically (down) and horizontally (to the left) to a different position as shown in Grid B. The second PBD 84 output, shown in Grid C, places both polarization components on the left side, but further separated. Grid D then graphically depicts the beams reflected from the SLM as elliptically polarized with varying azimuth, for return passage through the second PBD 84 which separates the beam into two pairs of orthogonal, linearly polarized components (Grid E), the lossy components being displaced by one increment to diagonally adjacent areas. These separated components are directed to the first PBD 82, which transforms the four beams into three beams, wherein the desired polarization independent signal carrying beam is centrally positioned and the other two lossy, rejected beam components, shown as outlined dots, are vertically displaced by two increments as seen in Grid F. At the same location, the orthogonally polarized components are combined at the mid-range level of the grid, on the right side, as to provide the polarization independent output beam (Grid G). The lossy components are deflected outside the field of view of the optics before they reach the input fiber, and the controllably attenuated beam is captured by the input fiber and is then diverted away from the input to the output of the system.

Figure 10:
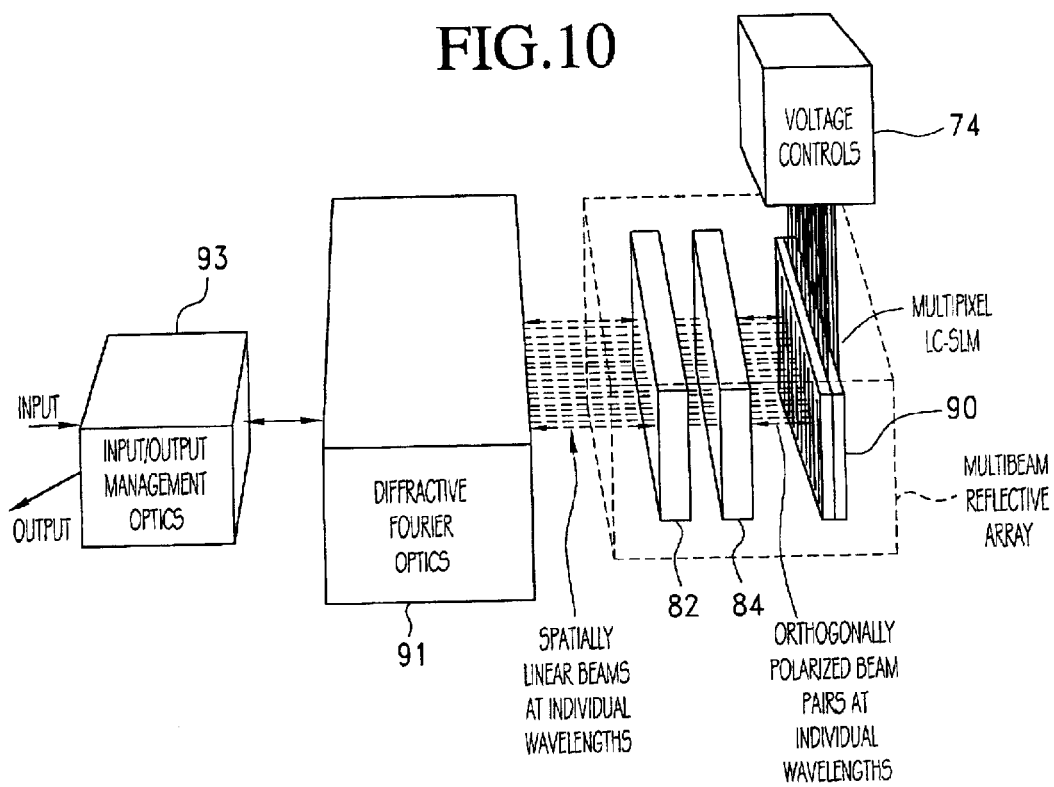
FIG. 10 is a simplified perspective and block diagram view of the system of FIG. 8, illustrating the overall system.

This compact and optically efficient arrangement is also advantageously suited for use in a multichannel array system, as shown in FIG. 10. Here the complete LC-SLM assembly 90 which receives distributed wavelength components from diffractive Fourier optics 91 constitutes a linear array of, in this example, one hundred pixels or cells, with the center of each elongated pixel being located at an ITU channel center in a WDM system. In this example, the width of each pixel is selected to provide a single 50 GHz wide channel, with the pixel centers being nominally spaced by 25 microns with a 3 micron inner pixel gap. For 100 GHz channel spacing, the pixel centers are nominally spaced by 50 microns. The pixel widths and separations are, in addition, precisely chirped, as needed to center dispersed wavelength components on the pixels, in accordance with standard wavelength channel allocation, by increasing the pixels in width along the array by about 10%. This reflective LC-SLM array 90 is designed to provide 1550 nm retardation for zero volt activation and the high transmission state at full voltage retardation with the high extinction state occurring at π/2 added retardation because of an incorporated quarter waveplate. Because of this design feature, in the event of a power failure, the individual pixel cells are non-blocking. The recombined signals returned from the diffractive Fourier optics 98 are provided to input/output management optics 93 which may include a circulator 93.

The examples of FIGS. 1–6 and 8–10, which employ single input/output collimators, in a shared fashion, afford some relief from criticality in alignment of the system and its components. Since the input beam is directed into the multiple beam folding system, with each beam path having substantially like (if not identical) optical path lengths, and since the beam paths are retraced in the same sequence reversely, the output beam retracks the input alignment. Thus, if there is a small misalignment at the input beam, this pointing error does not compromise the coupling efficiency of the output beam. The shared input/output collimator thus improves the alignment tolerance budget of the system and permits other compromises to be made.

Reflective LC-SLM Physical Layout

The LC-SLM's described herein are typically of the reflective type and consist of a linear array of elements separated by interpixel gaps. An individual cell constitutes one element of an array, but the polarization sensitive elements usually span the entire array, while diffractive Fourier optics provides components of one individual wavelength signal as input to each diffractive cell and recombines separate signals from all cells into an output. In general, the cell can be of the twisted or zero twist nematic liquid crystal type. The amount of retardation of the liquid crystal cell necessary to achieve high extinction is in general wavelength dependent and the phase retardation introduced by the liquid crystal is temperature dependent to a known degree. The control unit 74 (as in FIGS. 8 and 10) therefore provides individual control voltages for each of the cells to compensate for these variables. Alternatively, an active temperature stabilization system may be used for the LC-SLM array.

Figure 11:
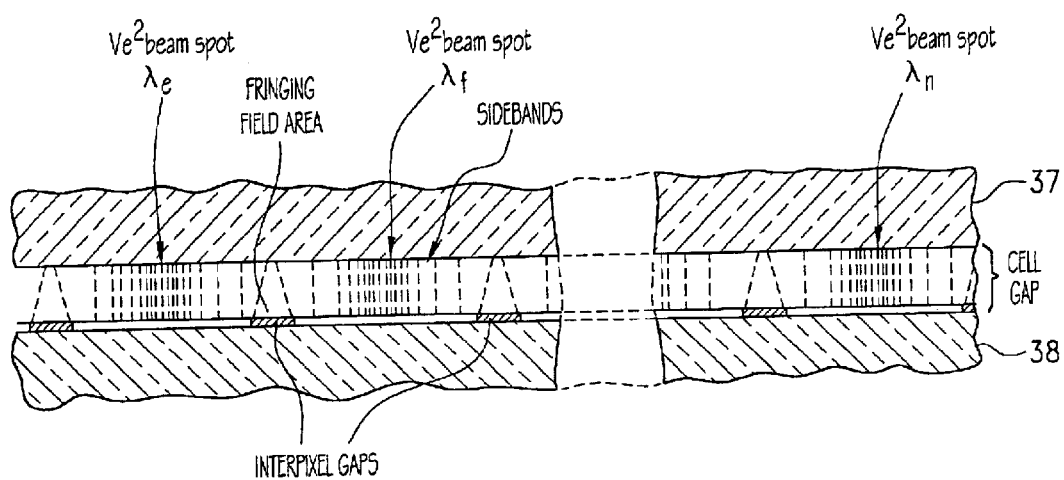
FIG. 11 is a magnified cross-sectional view, taken along one edge of an array, of LC-SLM cell gap regions, illustrating in general form the sagittal distribution of individual beams having sideband components across the pixel surfaces and interpixel gaps.

FIG. 11 illustrates an expanded cross sectional top edge view of parts of adjacent individual LC-SLM cells 27 along an array including cell surfaces which lie along the sagittal direction. The front window 37 is spaced from the back window 38 by a cell gap confining the liquid crystal material through which the beam passes. The reflective backplane for the array, consists of patterned gold electrodes on the rear surface 38. The cell gap is nominally 4 to 4.5 $\mu$m, and the interpixel gap between electrodes is nominally 2.5 to 3 $\mu$m. The lateral extent of fringing electric fields between the electrodes is typically equal to the cell gap. Since fringing fields produce non-uniform electric fields near the edges of the pixels, those regions within a fringing field area could potentially suffer from non-uniformities in the retardation characteristics. Such non-uniformities would place limitations on the adjacent channel isolation when inserted into the complete optical system. Therefore, it is advantageous to maintain a ratio of pixel width, or center-to-center spacing, to interpixel gap that is in excess of 15:1. This provides a high bandwidth utilization factor for channelized DWDM components, typically in excess of 80%.

FIG. 11 depicts how in a general sense, the light energy at each adjacent pixel or cell is distributed across much of the sagittal width of the pixel surface, because of the high data rate modulation (e.g. 10 Gbs) imposed on the wavelength at each individual source (e.g. laser). Such modulation broadens the width of the optical intensity spectrum of the wavelength channel to approximately twice the data rate, i.e. here about 20 GHz. In turn, this results in an effective broadening of the sagittal beam width in terms of $1/e^2$ intensity at the dispersive LC-SLM plane by about 30 $\mu$m, for each individual channel. The frequency distribution of an ideal single frequency laser source is a delta function, so the spectral width of an unmodulated source is very narrow. Since the wavelength source is data modulated at a high data rate (e.g. 10 GHz), which can be varied for different transmission requirements, the sideband components broaden the spectral width of the source, and as a consequence the passband required to transmit this modulated carrier in an undistorted fashion becomes substantially wider. The term "passband" is used here, as in the conventional sense, to designate that band in which the amplitude is within a certain level, e.g. 0.5 dB, of the maximum amplitude. The asymptotic skirts of the Gaussian curve may extend out indefinitely, in theory, but practically the distinct modulated wavelength peaks in the diffractively dispersed spectrum are separated by nulls in intensity. Configuring polarization diversity optics and an LC-SLM array so that channel separation and optical performance can be maintained while preserving the compactness and operating advantages of a diffractive Fourier optics system is a challenge that has not previously been met.

In general, high performance fiberoptic components should exhibit passband widths in excess of 20 GHz. Since the center-to-center beam spacings are predetermined by the diffractive Fourier optics system, the dimensions and ratios of the center-to-center pixel spacings and the interpixel gaps are important to the passband and stopband widths. In the examples shown, the pixel widths of each cell are nominally 85 $\mu$m, and the interpixel gaps are less than 3 $\mu$m. The spatial wavelength dispersion across the pixel is 0.6 GHz/$\mu$m, so that the available −0.1 dB passband is 37.5 GHz. The filter response rolls off by greater than 40 dB within 12.5 GHz, providing a stopband of 37.5 GHz. The interpixel gaps provide a contribution to stopband response by limiting the effect of extreme fringing fields. It is preferred that the ratio of pixel spacings, center-to-center, to the interpixel gap be in a ratio of at least 15:1.

Dual Elevation Optical System with Polarization Independent Diffraction Gratings Substantially similar diffractive Fourier optical systems can be extended from those examples above with a single input beam to a system with a double input beam. This can provide added functionality and performance to the system, but requires different polarization diversity optics. For example, with this approach one can provide a device with a single input and a single separate output, a single input and two outputs (with the addition of one circulator), or a device with two inputs and two outputs (with the addition of two circulators).

In general terms, a pair of 1 mm O.D. collimators can be precisely mounted in a base at different elevations and positioned in-line with a group of three cylindrical lenses for anamorphic beam shaping such as is disclosed in the Rakuljic et al. application referenced above. Since the focusing by the cylindrical lenses is performed in a direction perpendicular to the direction joining the two collimators, the three lenses can be shared among one or more collimators, simply by increasing their size. The input/output signal from the first collimator and the input/output signal from the second collimator are thus both shaped into nominally identical anamorphic beams elongated in the sagittal plane (transverse to the plane of the paper).

The tightly refolding, three dimensional multi-path capability of a diffractive Fourier optics system affords an opportunity for polarization diversity or management optics to be used to provide interleaver, express/drop, band splitting and other capabilities, in conjunction with modified input/output structures. In FIG. 12, for example, the input/output unit 102 comprises a double collimator having precisely spaced parallel collimators 103, 104 for input/express beams and drop beams, respectively. The two collimators 103, 104 are separated by a gap of the order of 1 mm in elevation and are optically parallel. The input DWDM beam from one collimator 104 is transmitted into a polarization independent diffractive Fourier optics system 91' via an anamorphic converter, and sagitally dispersed wavelength beams are directed from the system 91' into polarization diversity optics 105 and then onto reflective liquid crystal cells 90. It is to be understood that the diagram shows polarization diversity optics 105 which are common to all cells of the LC-SLM array 90 but that only one LC and voltage control 74 are needed for this description.

In the polarization diversity optics 105, four birefringent PBDs 106, 107, 108, 109 are disposed in series, with thicknesses chosen to match optical path lengths and provide beam splitting to precisely different elevations. Between the PBDs, 106–109, polarization rotators 112, 113, 114 and 115 are disposed in one or two beam paths to shift the polarization alignments of beams so that they are parallel to or perpendicular to the optical axes of the adjacent PBD, as required for linear or angled beam placement. In FIG. 12, the polarization angles for the beams, whether perpendicular or parallel to the plane of the paper, are shown by an encircled dot or an upward arrow, respectively.

Input beams, of an arbitrary state of polarization, are thus split by the first PBD 106 into two beam spots, with orthogonal components which arrive at the individual LC cell 90 at two different elevations, as shown by solid lines. If fully reflected as express signals, they return without diversion along the same paths, to the first PBD 106, where they are combined into an output signal with the same SOP for the diffractive Fourier optics system 91 and returned as the "express" or throughput output. If the control signal applied to the LC 90 introduces 90° rotation of the polarization direction, representing selection of the "drop" output, then the reflected signals, as indicated by the dotted line paths, are separated from the input paths at the fourth PBD 109. The fourth PBD 109 diverts the upper beam to an upper elevation at which polarization is rotated, but the lower beam is passed back linearly and then diverted upwardly in the third PBD 108. The two returning beams are recombined but with orthogonal, inverted relationship by the third PBD 108, rotated, split in the second PBD 107, and recombined and restored to the original SOP by the first PBD 106.

Depending on the selection made at the individual LCs in the array 90, therefore, the channel signals are propagated back through the diffractive Fourier optics 91 at one of two different elevation levels as outputs matching the elevation differential between the collimators 103, 104. The polarization diversity optics 105 ensures that the elevation differential matches the collimator spacing and the outputs are properly aligned.

The two input and two output configuration potentially provides twice the functionality within a single device. That is, a single component can perform channel equalization independently for two optical fibers. This approach would therefore employ a two dimensional LC-SLM array (e.g., a two by one hundred pixel array). The upper linear array operates on signals carried by the upper optical fiber, and the lower linear array operates on signals carried by the lower optical fiber.

Dual Elevation Optical System with Polarization Dependent Diffraction Gratings

The multiple parallel refolding approach used in the system of FIG. 12 is also applicable to situations in which beam polarization splitting is introduced prior to polarization dependent diffractive Fourier optics, as shown in FIG. 13. Numerical designations that are compatible with other figures are used to the extent feasible but are distinguished by use of a prime symbol (e.g. 102'). In FIG. 13 the input/output structure 102' includes a pair of spaced apart and parallel collimators 103', 104' but here the upper collimator 103' receives the input signals and returns output signals, while the lower collimator 104' is used for providing multiplexed drop outputs. Each collimator 103', 104' has optical continuity with an anamorphic converter 12b', 12b" respectively, each of which in turn lies on an optical path extending through a beam splitter 14', such as a Wollaston multi-prism device.

The shaped output from the anamorphic beam converter may again be split into two precisely diverging polarized beam components (s and p polarization), but in a single or double Wollaston beamsplitter. The double Wollaston beamsplitter, also disclosed in the Rakuljic et al. application, may be advantageous in providing a high numerical aperture device, one independent of beam incidence location on the beamsplitter. The device comprises two beam pairs of birefringent (YVO$_4$) or wedges, the wedges of each pair being oppositely tapered and having taper angles of 2.5°. The two pairs of optical wedges are separated by a quartz half waveplate which rotates the polarization of each beam by 90°.

Diverging input beams of orthogonal polarization from the beam splitter 14' are directed at one level through one pair of polarization rotators and optical path length equalizers 15', 15" respectively, to the polarization dependent diffractive optics system 91'. The polarization dependent diffractive Fourier optics system 91' delivers the closely spaced convergent inputs to the polarization diversity optics 105', in which a pair of birefringent PBDs 117, 118 are disposed serially prior to the LC-SLM 90', where each cell is controlled by the voltage control 74' as needed for the function being performed.

Split polarization components propagated from the diffractive Fourier optics system 91', are applied to the first PBD 117 which has its optical axis angled to transfer the like input polarizations in parallel without refraction, while the second PBD 118 is positioned and angled, and of a path length, to converge the two different polarization components downwardly to form a superposed beam waist at the focal plane of the LC-SLM 90'. Those signal components which are not to be transformed, return reciprocally through the second PBD 118 and the first PBD 117, moving upwardly first and then in parallel to be refolded in the Fourier optics system 91'. At the input/output structure 102' the separated polarization components are recombined at the upper level and provided as express or throughput signals from the collimator 103'. For drop signals, however, a selected voltage is used to transform the ellipticity and azimuth of the incident beam at that cell, so the slightly divergent polarization components are angled downwardly in the second PBD 118 and then propagate straight through the first PBD 117. Thus the dropped beam components are refolded within the diffractive Fourier optics system 91' at a difference in elevation which, at the output, returns the converging polarization components to the input/output structure 102' at the second collimator 104'. As noted above, this system is suitable for denser channel spacings and may be configured as a interleaver as well as a bandsplitter simply by the control functions selected for the individual cell operations.

LC-SLM Pixels Wider than Optical Impulse Response

The relative size of the optical impulse response relative to the LC-SLM pixel width is an important configuration in the design of fiber coupled, LC-SLM modulators. Typical optical systems as described above utilize LC-SLM's with about 100 pixels. In this configuration, a single input wavelength (i.e., optical impulse response) illuminates only a fraction of the area of each individual pixel. That is, the pixel width is greater than the optical beam width formed by a single wavelength at the focal plane of the system. This is the optimized configuration for a device requiring the highest optical resolution and wide, flat passbands. Optical fibers have a mode of nominally 10 $\mu$m waist diameter upon exiting the fiber. Typically, this mode size in the wavelength dispersion direction is maintained by the imaging system such that a 10 $\mu$m wide spot is mapped to the LC-SLM plane. In practice, it is undesirable to further reduce the spot at the LC-SLM because the depth-of-focus for such a system is reduced by a factor equal to the square of the spot size. This reduces the alignment tolerances to a degree which is difficult to maintain in a stable fashion. Therefore, preserving the spot size at the LC-SLM plane achieves the highest wavelength resolution performance when balancing the optical performance with packaging stability and manufacturing constraints. In this case, the interpixel gaps further lie outside of the passbands of the optical response, reducing the loss arising from the interpixel gaps and preserving the flat passbands inherent in this approach.

LC-SLM Pixels Narrower than Optical Impulse Response

For some applications it is advantageous to select a pixel width which is narrower than the optical wavelength impulse response of the optical system. This enables smooth rather than a histogram-like optical response. In this approach, careful management of the signal response in the interpixel gaps is required to minimize passband ripple-type effects. The interpixel gaps can be either reflective or transmissive, depending on the application. Reflective interpixel gaps provide flat intensity characteristics; however, the phase characteristics may exhibit ripple. Alternately, transmissive gaps provide slight intensity ripple. In practice these ripple affects are manageable. Therefore, this type of response may be advantageous for fiberoptic gain equalizers which compensate for continuous gain and loss variation with wavelength across the transmission band. For example, EDFA amplifiers exhibit variations in gain with wavelength, temperature, number of channels and aging. Therefore, an optical component placed before, after, or within an optical amplifier can dynamically alter the gain characteristics to achieve the desired response. Typically, a net wavelength independent response is sought. In some cases, built-in optical channel monitoring functionality may be part of the gain equalizer.

Figure 14:
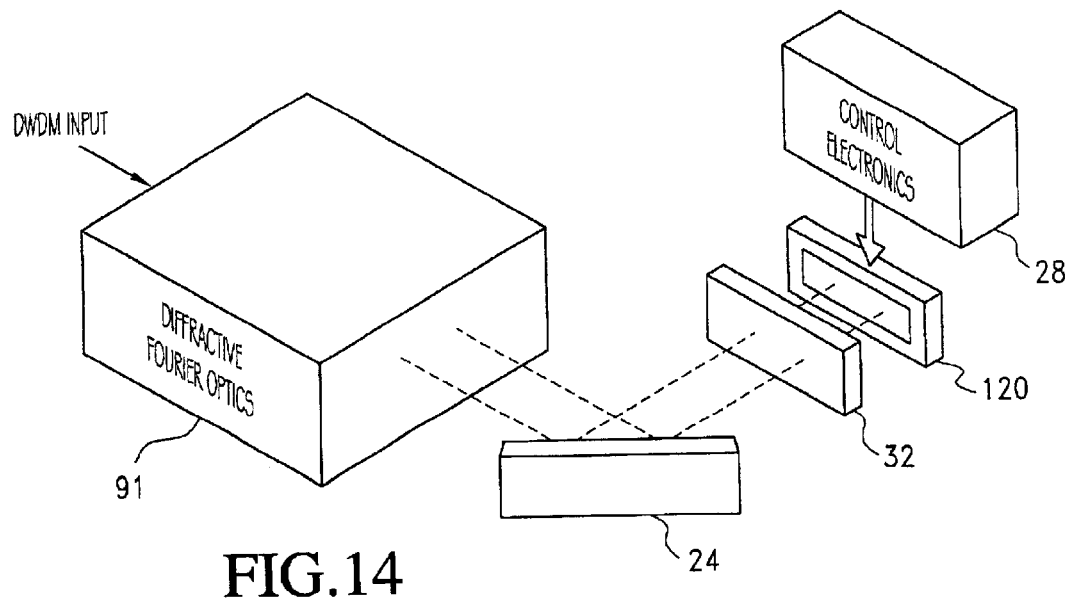
FIG. 14 is a simplified perspective view of a different beam control system employing an array with multiple controllable pixels per individual wavelength beam to provide gain or channel equalization in an optical communications system.
Figure 15:
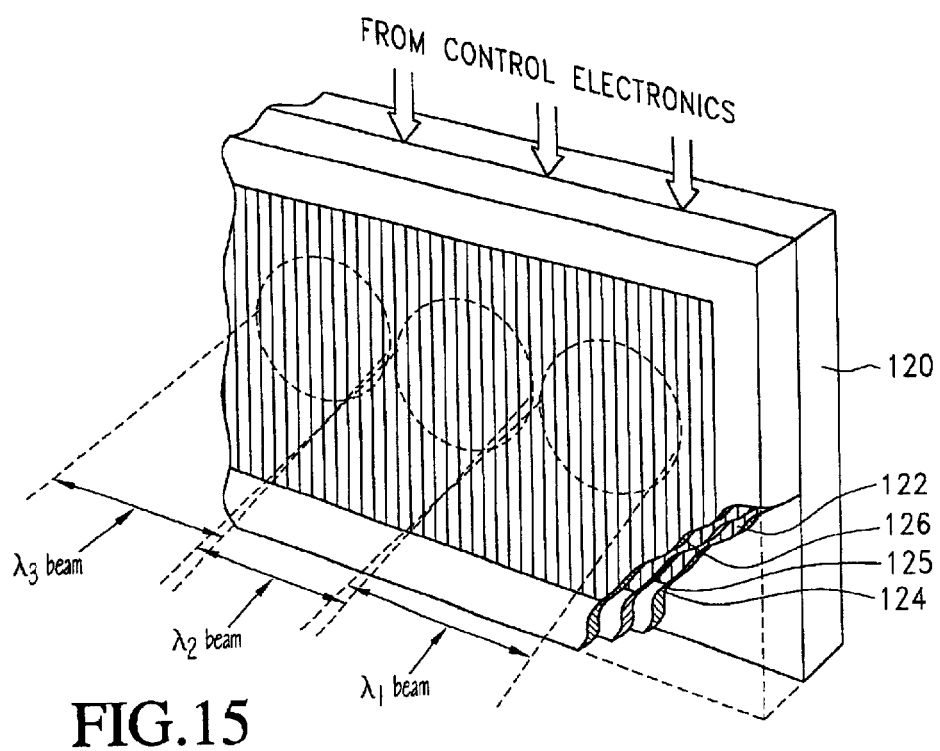
FIG. 15 is a perspective, simplified, fragmentary view of a number of adjacent LC cells in relation to incident beam spots, illustrating the spatial distribution of each beam relative to a number of LC cells in the system of FIG. 14.

A gain equalizer of this invention may advantageously utilize the principal elements of the channel equalizer previously described, with, however, a unique pixel format of the LC-SLM, and corresponding control arrangement. As shown in FIGS. 13 and 14, a 4096 1-dimensional pixel array 120 with cells 122 of 1.8 um pixel pitch is used, together with a fully reflective back mirror plane 124, a front window 125 and a front quarter waveplate 126 for nominally half wave round-trip retardation. The pixel cells 122 consist of zero twist nematic liquid crystal elements in which the rubbing or alignment layer is oriented such that the optical axis of the cell is precisely parallel to the long axis of the LC array 120. To achieve the dense pixel pitch and the large number of pixels, the backplane 124 may be fabricated using standard silicon processing and lithographic techniques.

Using the diffractive Fourier optics configuration, the overall width of the component optical beams for a wavelength band of 35 nm (C band or L band) illuminates approximately 2 to 10 mm of the SLM-array 120, whereas a combined C and L band device is to illuminate about 4 to 25 mm. The $1/e^2$ optical impulse response of the input beam is selected to span a chosen number of pixel elements (e.g. five). This produces an optical response which is smooth and continuous, rather than pixilated according to ITU channels, as is typically the case for a channel equalizer in which each beam component illuminates only a fraction of a pixel. In this particular example, the $1/e^2$ beam full width of optical impulse response ranges from 10 to 100 $\mu$m, and the pixel pitch is 1.8 um. The interpixel gaps are sufficiently narrow (about 0.25 um) such that fringing fields impart a negligible effect on the optical response. These gaps are also highly reflective to maintain low insertion loss. This device may utilize a patterned silicon back plane to economically achieve conductor routing for a large number of densely spaced pixels. In general, silicon back planes are also advantageous in that they improve optical power handling due to their enhanced thermal conductivity, which facilitates heat removal from the regions of local beam illumination.

This same high pixel count LC-SLM can serve as a channel equalizer. Not only the attenuation, but also the attenuation slope within the passbands can be independently tailored. In addition, this device is channel spacing independent, as the widths of the passbands and stopbands can be arbitrarily controlled to within 3.5 GHz, which is the optical frequency spacing corresponding to the 1.8 um pixel pitch. The rear mirror displays continuous high reflectivity even between pixels, so that no light is lost in the interpixel gaps. This is important to maintain low loss optical performance.

Alternately, the identical LC-SLM used in the channel equalizer may comprise a gain equalizer. To synthesize a smooth response, the impulse response of the optical beam at the LC-SLM plane should be wider in the sagital plane, so that transmission ripple arising from the interpixel gaps is sufficiently small (<0.1 dB). Each pixel is nominally 20 to 100 um wide for 50 GHz channels, depending on the diffraction grating rulings and the optical system. By analyzing the convolution of the optical beam with the patterned reflector of the LC-SLM, the sagital optical beam width is required to be at least ten times the interpixel gap width to maintain the highest level of resolution with the lowest passband ripple. For example, FIG. 14 illustrates with some idealization the beam width superimposed on the multi-pixilated SLM. The residual ripple introduced by the inter-pixel gaps is minimal and the optical resolution in terms of the calculated step response rolls off 10 dB within about 100 GHz.

While a number of modifications and variations have been disclosed it must be recognized that the invention encompasses all forms and expedients within the scope of the appended claims.

We claim:

1. A system for individually modifying wavelength components of a DWDM beam of an arbitrary state of polarization comprising a combination of:

a diffractive beam separation system including spaced apart reflector surfaces for separating the wavelength components of the DWDM beam;

an optical system converging the separate components from the beam separation system into an array of beams of different wavelength forming beam waists serially dispersed in a sagittal direction at a focal plane;

a polarization splitter device disposed in the optical path for separating the polarization components of the wavelength components into adjacent beams;

a plurality of liquid crystal cells dispersed at the focal plane in an array along the sagittal direction and each responsive to the polarization components of a different wavelength component to transform the polarization direction of the components individually to selectable orientations, the cell array being configured to direct the transformed wavelength components back through the optical system for refraction and combination into a modified DWDM beam, and polarization diversity optics including at least one polarization sensitive element proximate each of the liquid crystal cells for rejecting, in the transformed wavelength components, polarization components of other than a selected orientation.

2. A system as set forth in claim 1 above, wherein the cell is a nematic element having a selected angle of alignment and the at least one polarization sensitive element has an optical axis in predetermined relation to the alignment angle to reject a proportion of the transformed polarization components.

3. A system as set forth in claim 2 above, wherein the beam waists at the focal plane are diffraction limited and wherein the polarization sensitive element is of birefringent material.

4. A system as set forth in claim 2 above, where beams at different wavelengths are propagated toward the cells of the array, the cells of the array are reflective, and the at least one polarization sensitive element is disposed in the path of beams reflected from the cells, the optical axis of the at least one polarization sensitive element being disposed to transmit beams toward the cells in the array without attenuation and to reject selectively transformed polarization components in beams reflected from the cells.

5. A system as set forth in claim 4 above, wherein the at least one polarization sensitive element is a polarizer plate angled to reject components by blocking the light energy thereof.

6. A system as set forth in claim 4 above, wherein the polarization sensitive element is at least one birefringent polarization beam displacer positioned with its optical axis to divert rejected components from the wavelength components.

7. A system as set forth in claim 4 above, wherein each cell comprises a zero twist nematic liquid crystal cell having a selected alignment axis, wherein the at least one polarization sensitive element has an optical axis in a selected relation to the alignment axis, wherein the cells are voltage controllable and the system includes voltage control circuits coupled to the individual cells.

8. A system as set forth in claim 7 above, wherein the optical system converges separate polarization components at each wavelength and with like polarization directions in superposed relation on the liquid crystal, and wherein the liquid crystal is disposed to return diverging transformed beams along reciprocal paths to the incoming beams.

9. A system as set forth in claim 8 above, wherein the system includes, proximate each liquid crystal cell, a polarizer plate and a quarter waveplate disposed adjacent the focal plane and introducing $\pi/2$ round trip phase retardation and circular polarization in the reflected beam at an angle determined by the control voltage.

10. A system as set forth in claim 2 above, wherein the optical system provides the array of beams of different wavelengths as single beams of arbitrary states of polarization, and wherein the at least one polarization sensitive element comprises at least two polarization beam displacers for (1) splitting the single beam for that wavelength into two spaced apart beams of orthogonal polarization and (2) recombining transformed beams from the liquid crystal cell into a single beam while rejecting components in accordance with the beam transformation by the cells.

11. A system as set forth in claim 10 above, wherein the liquid crystal cell is reflective, and wherein two polarization beam displacers at different optical axis alignments are disposed serially proximate the cell, and configured to direct lossy components after beam transformation out of the optical path of useful signals.

12. A system as set forth in claim 10 above, wherein the polarization beam displacers have optical axes in orthogonal relation and at 45° to the alignment angle of the liquid crystal cell.

13. A system as set forth in claim 2 above, wherein the optical system further includes an input/output structure having different elements disposed at different elevations transverse to the sagittal direction, and the cells and polarization diversity optics are configured to direct transformed wavelength components to either of selected ones of the different elements of the input/output structure.

14. A system as set forth in claim 13 above, wherein said at least one polarization sensitive element comprises at least two polarization beam displacers responsive to the beam transformation at the liquid crystal cells and directing beams at separate elevations corresponding to the elevation differential at the input/output structure back through the optical system to the input/output structure.

15. A system as set forth in claim 14 above, wherein the system includes polarization diversity optics including the said polarization beam displacers, and wherein said polarization beam displacers comprise a series of polarization beam displacers and interspersed polarization rotators for diverting drop signals to a first elevation and express signals to a second elevation, wherein the differential between the first and second elevations corresponds to the difference in elevation at the input/output structure.

16. A system as set forth in claim 13 above wherein the input/output structure includes polarization splitting elements between the input/output structure and the diffractive beam separation system, and the at least one polarization sensitive element comprises two polarization beam displacers disposed between the diffractive beam separation system and the liquid crystal cells for converging polarization components directed toward the liquid crystal cells onto a single beam surface, and returning transformed reflected beams of selected ellipticity and azimuth back to the beam diffraction system at a different elevation for coupling to the input/output structure at that elevation.

17. A system as set forth in claim 2 above, wherein the plurality of liquid crystal cells comprise cells having sagittal dimensions and pitch such that each incident beam at the focal plane impinges on a substantial number of cells, and wherein the system further includes control electronics coupled to the cells for providing control voltages which determine the local transformation introduced at each cell, such that the transformed components of an individual beam form a composite transformed beam having a number of differently transformed elements.

18. A system as set forth in claim 17 above, wherein the cells are configured with a pitch of less than 2 microns per cell, and the cells in the transverse dimension are about two orders of magnitude or more greater than the sagittal dimension, and wherein each beam is incident on at least about 5 cells, and wherein the cells are zero twist nematic liquid crystal cells, and wherein the at least one polarization sensitive element comprises a single element spanning the entire array of liquid crystals.

19. A system as set forth in claim 2 above, wherein the polarization splitter device is disposed in the path of the DWDM beam before the diffractive beam separation system, for providing diverging beams of different polarization at a selected angle of divergence and the polarization splitter device includes elements for placing the divergent beams in parallel polarization relation while retaining equal path lengths prior to the beam separation system.

20. A system as set forth in claim 19 above, wherein the polarization splitter device comprises a Wollaston prism device, a polarization rotator arranged to rotate one polarization component into parallelism with respect to the other and an optical element for equalizing optical path lengths.

21. The system as set forth in claim 20 above, wherein the angle of divergence between the polarization components is less than about 2°, wherein the optical system provides separated wavelength components that are substantially longer in the transverse direction than in the sagittal direction and convergent to superimpose the beam waists at the focal plane, and the liquid crystal cells are reflective and each have a substantially greater area than the area beam waists of the impinging beams.

22. A system as set forth in claim 2 above, wherein the cells are reflective and the polarization splitter comprises at least two birefringent elements each disposed as serial pairs adjacent the liquid crystal cells subsequent to beam separation, and wherein the at least two polarization sensitive elements have optical axes disposed at different angles to direct rejected components in diverging paths out of the field of view of signal components to be returned to the diffractive beam separation system.

23. A system as set forth in claim 22 above, wherein the system includes polarization diversity optics comprising a single polarized plate before the reflective cells of the array, an input half waveplate before the polarized plate and with optical axis aligned to rotate the polarization direction in a beam propagated toward the cell, the polarized plate and input half waveplate each being configured to span the length of the array, and wherein each cell also includes, immediately prior to the liquid crystal cell, a quarter waveplate providing a fixed phase retardation such that for zero control voltage, the cell is in full transformation state.

24. A system for blocking or modulating the intensity of individual wavelength components in a DWDM optical beam of arbitrary polarization, comprising:

a beam refolding system having facing and spaced apart grating and concave reflector devices, the grating comprising a Littrow grating and the reflector device comprising a Mangin mirror providing a convergence factor in the sagittal direction and a collimating factor in the transverse direction, with the grating and the mirror surfaces spanning substantially the same elevations in the transverse direction;

a beam polarization splitter dispersed in the path of the input beam before the beam refolding system;

an input optical structure disposed adjacent the Littrow grating and directing a DWDM beam through the polarization beam splitter and toward the reflector device at a given angle of inclination in the transverse direction, the input optical structure providing an anamorphic beam having its major dimension in the sagittal direction, the Littrow grating and reflector device being configured to serially refold the anamorphic beam while dispersing the wavelength components sagittally to converge to beam waists at a focal plane;

polarization diversity optics comprising at least one polarization sensitive element in the path of the converging diffracted beam components between the beam refolding system and the focal plane, and an array of reflective liquid crystal cells at the focal plane, the liquid crystal cells being individually controllable to transform the polarization of the beam components to selectable orientations, the at least one polarization sensitive element being oriented to reject polarization components of other than the selected orientation, and to redirect the reflected beam components back through the beam refolding system and the beam polarization splitter to the input optical structure.

25. A system as set forth in claim 24 above, wherein the beam polarization splitter divides the DWDM beam into orthogonally polarized components, and wherein the system further includes an optical device, including a waveplate for aligning the polarization components in the same direction while maintaining equal optical path lengths.

26. A system as set forth in claim 25 above, wherein the liquid crystal cells are zero twist nematic cells having a predetermined optical axis, and wherein the beam refolding system is configured to superimpose the polarization components of the dispersed wavelength components at the focal plane in a selected orientation to the predetermined axis, and wherein the local intensity of an incident beam on a cell does not exceed about 200 W/mm².

27. A system as set forth in claim 26 above, wherein the polarization components are aligned in the parallel and the sagittal directions, wherein the polarization components are converged onto the focal plane at different angles, wherein the dispersed wavelength components are sagittally separated and asymmetric with a long dimension in the transverse direction, and wherein the sagittal pitch of the cells are varied to receive incident wavelength components centrally.

28. A system as set forth in claim 27 above, wherein the dispersed wavelength components are about 200–250 microns in the transverse dimension, and have, including sagittally dispersed sidebands, sagittal dimensions that are substantially less than the transverse dimension, and wherein the cells have a sagittal dimension more than the optical intensity span of the sagittal dimension of the beam.

29. A system as set forth in claim 28 above, wherein the converging polarization components follow different paths of about 3° and 2° relative to a sagittal plane and about ±0.5° relative to the cell surface and the cell reflects each of the components along the incident beam path of the other component and wherein the at least one polarization sensitive element is a polarizer having a selected optical axis blocking polarization components reflected from a cell at other than a predetermined orientation.

30. A system as set forth in claim 27 above, wherein the at least one polarization sensitive element comprises at least one polarization beam displacer having an optical axis disposed to divert polarization components reflected from the cell at other than a predetermined orientation from the beam path of oriented components.

31. An array for controllably modulating individual optical beams of different wavelengths with different ones of a plurality of voltage controllable cells, wherein each of the cells receives a different incident optical beam disposed along a sagittal direction and comprises:
  a liquid crystal element having a light transforming area responsive to a control voltage for transforming incident beam components in accordance with an applied voltage level to elliptically polarized output wavefronts of controlled azimuth, and
  polarization diversity optics comprising at least two serially disposed polarization beam displacers in the path of the optical beams adjacent the liquid crystal element, the polarization beam displacers being of like optical thickness and optically aligned at angles differing by 90°, to displace an input beam into orthogonally polarized beam components by a separation in one direction that is within the dimensions of the light transforming area and to combine separated output beam components in a second direction after transformation while attenuating the output beam components in accordance with the controlled azimuth.

32. An array as set forth in claim 31 above, wherein the polarization diversity optics separate the beam components by a spacing on the order of 100–200 microns, wherein the liquid crystal elements are zero twist nematic cells disposed in an array of sagittally separated positions and longer in the transverse direction than they are wide in the sagittal direction, and wherein the cells receive separate wavelength and orthogonally polarized beam components.

33. An array as set forth in claim 32 above, wherein the beams of different wavelengths are distributed in the sagittal direction in accordance with the beams' wavelengths to produce a distribution of individual wavelength signals and the widths of the cells and cell pitches along the array are varied in accordance with the distribution of individual wavelength signals, and wherein the optical axes of the polarization beam displacers are aligned to better than 0.5° of 90° with respect to each other, wherein the liquid crystal element is aligned to better than 0.1° of 45° with respect to the closest polarization beam displacer and wherein the liquid crystal element has an entrance face lying in a plane that is tilted by greater than about 0.5° to a perpendicular relative to the incident beam axis, and wherein the polarization beam displacers are birefringent crystals having like optical thicknesses and providing matched path lengths that minimize polarization mode dispersion.

34. An array as set forth in claim 33 above, wherein the orthogonally polarized beam components are each about 70 microns in height by about 10 microns in width, and wherein the birefringent crystals are of $YVO_4$ and about 2.0 mm in length, and wherein the polarization beam displacers that receive the transformed beam components are configured to divert lossy beam components in transverse position from the output beam components.

35. An array as set forth in claim 31 above, wherein the liquid crystal element is a zero twist nematic reflective element and wherein the at least two serially disposed polarization beam displacers propagate both the input beam components in the one direction and the output beam components in the other direction.

36. A system for modifying signals throughout a given spectral band of DWDM optical signals wherein a spectral function is known and serves as the basis for a plurality of control signals, comprising:
  a diffractive optical system receiving the DWDM signals and generating wavelength dependent spatially separated beams in a sagittal plane, the diffractive optical system including an optical structure for converging the separated beams toward an image plane, with predetermined beam spot size for each beam;
  a beam transformation system positioned to intercept the converging beams adjacent the image plane, the beam transformation system including a linear array of liquid crystal cells, each individually controllable, and aligned in series along the sagittal plane of the beams to intercept the beams, and also including adjacent polarization diversity optics, wherein the cells are sized relative to the beams such that each beam impinges on a number of adjacent cells concurrently, the beam transformation system and polarization diversity optics attenuating the beams in accordance with control signals applied to the cells; and
  voltage control circuits responsive to the known spectral function for providing control signals driving the cells to introduce a spectral correction function, in the band.

37. A system as set forth in claim 36 above, wherein the spectral function is a gain versus wavelength function, wherein the control signals provide an equalizing function to linearize gain versus bandwidth over the spectral band, and wherein the system further comprises output optics coupled to the diffractive optical system receiving attenuated beams from the cells for providing a gain equalized DWDM signal.

38. A system as set forth in claim 37 above, wherein the beam transformation system includes a plurality of zero twist nematic reflective cells, the cells having center-to-center spacings in the sagittal plane such that the individual beams are incident on the order of ten cells or more within the $1/e^2$ power distribution of the individual beam, and the beam transformation system further includes polarization diversity optics for attenuating reflected components in accordance with the transformations introduced by the beam transformation system.

39. A system as set forth in claim 38 above, wherein the beam transformation system comprises an array of greater than $10^3$ pixels having less than 5 $\mu$m center-to-center spacings, wherein the cells have an interior pixel gap of less than 0.50 $\mu$m and a transverse dimension of greater than about 300 $\mu$m, and wherein the cells further comprise reflective back planes and zero twist nematic layers.

40. A system for equalizing gain across a given optical spectrum within which individual wavelength channels have different known gain characteristics varying non-abruptly from channel to channel, signals for the channels being distributed spatially as individual beams of a first cross-sectional size across a given sagittal width at an object plane, the system comprising:
  a plurality of controllable light attenuating elements disposed along the object, there being a number of light attenuating elements within the cross-sectional area of each beam;
  a plurality of control drivers, each coupled to at least a different one of the elements for controlling the local attenuation thereat in relation to the known gain characteristics of the channel;

an optical system responsive to the controllably attenuated beams from the elements for providing a wavelength division multiplexed output, and wherein the responses minimize transmission ripple from gaps between the attenuating elements, and the system provides a smooth gain function across the given optical spectrum.

41. An optical beam modulator for modifying a beam of at least one given wavelength and arbitrary polarization, comprising:

an optical system providing separated but aligned asymmetric polarization components of the beam in separate paths converging at a focal plane;

a controllable polarization transformer positioned at the focal plane and reflecting both beam components, after transformation, into principal beam paths that diverge reversely relative to the converging paths, and a polarizer element having a selected optical axis orientation relative to the alignment of the polarization components, the polarizer element being positioned in the path of the reflected beam components and rejecting a portion of the components to modulate the energy in the principal beam paths in accordance with the transformation of the polarization components.

42. A modulator as set forth in claim 41 above, wherein the angle of convergence of the polarization component of the beam is in the range of about 1°, wherein the asymmetry of the components is greater than five to one, and wherein the beam components pass through the polarizer element in both the converging and diverging directions.

43. A modulator as set forth in claim 42 above, wherein the polarization transformer comprises a zero twist nematic liquid crystal cell having an optical axis at 45° and the polarizer element has an optical axis at 90°.

44. An optical modulator for attenuating an individual input optical beam derived from a wavelength division multiplexed optical communications beam, the modulator providing attenuation in the range of 0 to 20 dB with 0.05 dB resolution comprising:

a reflective zero twist nematic liquid crystal cell having an optical axis and including a compensator plate aligned at 180° to the optical axis, the cell having an active area with a width bounded by a nonconductive element, the input optical beam being diffraction limited and having a $1/e^2$ spot distribution incident on the active area;

a voltage controller coupled to the cell for applying a voltage in a range to induce up to a quarter wave phase retardation of the incident optical beam; and a polarized element having an optical axis at 45° to the optical axis of the cell, and in the path of the incident and reflected optical beams to and from the cell to reject a proportion of the reflected beam dependent on the amount of phase retardation.

45. An optical modulator as set forth in claim 44 above, wherein the cell includes substantially parallel and spaced apart front and back plane surfaces confining a liquid crystal material, and a polyimide layer on at least one of the surfaces in contact with the liquid crystal material and having a surface alignment pattern defining the director axis of the cell, the polarized element being proximate the front surface and tilted by greater than 0.5° relative to the plane surfaces of the cell.

46. A diffractive Fourier optics system which spatially distributes from a DWDM optical input beam a plurality of individual wavelength optical beams along a sagittal plane, a modulator system for individually modifying the wavelength components and returning them for recombination into a modified DWDM optical output beam, with low adjacent channel crosstalk comprising:

an optical system disposed and configured with the diffractive Fourier optics system to direct the sagittally distributed separate wavelength component beams with a predetermined minimum center-to-center spacing of adjacent wavelength beam spots to a focal plane;

an array of reflective zero twist nematic liquid crystal cells sagittally distributed at the focal plane, the cells representing pixels having pixel to pixel spacings chirped to match the distribution of wavelength component beams and including interpixel gap barriers which separate the pixels, wherein the pixel to pixel spacings in relation to the interpixel gap barriers have a dimensional ratio of at least about 15:1 in the sagittal direction, and polarization sensitive elements adjacent the cells and having optical axes in selected relation to the alignment direction.

47. A modulator system as set forth in claim 46 above, wherein the center optical wavelength of the spectral band of the DWDM beam is about 1550 nm, wherein the beams are data modulated, wherein the interpixel gap barriers have widths in the range of 2 to 6 microns and the pixel cell widths are in the range of 75–95 microns, and wherein the beams exclusive of modulation components have $1/e^2$ distributions with sagittal widths in the range of about 8 to about 11 microns and with modulation components have $1/e^2$ distributions with sagittal widths in the range of about 30 to about 40 microns.

48. A modulator system as set forth in claim 47 above, wherein fringing fields sagittally extending from the beam spots are incident in overlapping relation on the interpixel gap barriers and the interpixel gap barriers are approximately 2.5 to 3 microns in sagittal width.

49. A system for independently controlling different wavelength signals in a DWDM beam, comprising the combination of:

a diffractive Fourier optics system configured to provide compact three dimensional beam refolding at low angles while distributing wavelength components of the DWDM beam in a sagittal plane;

an input/output structure having separate input/output elements at different elevations transverse to the sagittal plane, one of said input/output elements receiving an input DWDM beam;

a liquid crystal spatial light modulator array disposed parallel to the sagittal plane and having a plurality of voltage controllable reflective elements that are sagittally dispersed to receive individual wavelength components of the DWDM beam from the diffractive Fourier optics system, and polarization diversity optics disposed between the diffractive Fourier optics system and the spatial light modulator array, for applying different wavelength components from the diffractive Fourier optics systems to the different cells of the array and transferring reflected wavelength components from the cells of the array back to the diffractive Fourier optics system at one of two levels corresponding to the transverse spacing between the elements in the input/output array.

50. A system as set forth in claim 49 above, wherein the diffractive Fourier optics system is configured to provide individual wavelength components as single beams, and wherein the polarization diversity optics includes a succession of polarization beam displacers with lengths and optical axes configured (1) to split the individual wavelength component into a pair of beams both incident on the cell of an array and (2) to return reflected beam components from the cell, dependent upon the control imposed thereby, to a different selected level, dependent upon whether the reflected signal is to be sent to one input/output element or the other, the elevation differential between the beams corresponding to that between the input/output elements.

51. A system as set forth in claim 49 above, wherein the input/output structure includes beam polarization splitters in the optical path of beams from each separate input/output element, and wherein the polarization diversity optics comprises a pair of polarization beam displacers interposed in serial fashion between the diffractive Fourier optics system and the elements of the array, the beam polarization displacers having lengths and optical axes configured to converge input signals to superposed beam spots on the associated element, and in response to controlled individual control of the beams at the elements and return other beams to the same input/output device and returning transformed beams to the other of the input/output elements.

52. The method of modulating individual wavelength signals in an arbitrarily polarized DWDM optical beam comprising the steps of:
  diffractively separating the wavelengths in a sagittal direction by forming individual arbitrarily polarized wavelength beams;
  directing the individual beams to form a sagittally distributed series of converging beams having beam waists at a focal plane;
  separately delivering the polarization components of the individually separated beams within a given individual area at the focal plane, the average beam intensity at the focal plane being below a selected level;
  controllably transforming the separate polarization components within the given individual area for each beam at the focal plane to a selected orientation corresponding to a desired degree of modulation of the individual beam;
  directing the transformed components in a second direction;
  rejecting portions of the reflected individual beam components determined by the amount of transformation while transmitting the remaining portions;
  recombining the polarization components of the different beams, and
  diffractively recombining the individual beams after modulation into a DWDM beam.

53. A method as set forth in claim 52 above, wherein the separate polarization components for each signal are variably transformed to variable ellipticity and azimuth and reflected back for recombination.

54. The method of modifying individual wavelength signals as set forth in claim 48 above, comprising the steps of:
  initially separating the DWDM beam into s and p components, transforming p components to parallel alignment to s component;
  splitting the two beam components into separate wavelength signals;
  transforming the polarization state of each individual p component wavelength signal;
  polarization filtering each separate wavelength signal after transformation, and
  recombining the polarization components after diffractive recombination.

55. The method as set forth in claim 54 above wherein the positions of individual areas for polarization transformation are varied in accordance with beam position in the sagittal direction, to provide uniform channel spacing between separate wavelength components, and wherein the transverse to sagittal dimension ratio of the separate wavelength components is in the range of 10–100:1.

56. The method as set forth in claim 55 above, wherein the step of controllably transforming comprises retarding the beam components during transformation, and wherein the beam angles and path provide an extinction ratio in excess of 40 dB for signal blocking or alternatively substantially linear attenuation in the range of 0 to 20 dB for signal equalization.

57. The method of modifying individual wavelength signals in a DWDM optical beam as set forth in claim 52 above, further comprising the steps of:
  diffractively separating the arbitrarily polarized beams while retaining arbitrary polarization;
  splitting each separated beam into separate polarization components proximate to the focal plane;
  directing the separate polarization components to the focal plane in orthogonal polarization relation and linearly separated in the transverse direction, relative to the given individual area;
  reflectively transforming the polarization components at the focal plane to a degree corresponding to the desired amount of modulation;
  recombining the polarization components of the individual beams adjacent to the focal plane, while rejecting controlled portions thereof depending upon the rotation angle, and
  diffractively recombining the individual beams into a modulated DWDM signal.

58. The method of modulating individual wavelength signals as set forth in claim 57 above, comprising the steps of displacing the beam components in accordance with polarization proximate to the focal plane, and wherein the reflective rotation comprises generating reflected beams of elliptical polarization and the rejected portions of the beams are directed in optical paths separated from the chosen components of the beams.

59. The method of controllably modifying individual wavelength signals in a DWDM optical beam having an arbitrary state of polarization, comprising the steps of:
  diffractively separating the individual wavelength components in a sagittal direction into individual wavelength beams which are asymmetric in a direction transverse to the sagittal direction while converging the beams to form beam waists at a focal plane;
  also separating the wavelength components into aligned polarization components converging separately in the transverse direction to be superposed at the focal plane, the beam intensity at the focal plane being locally below a selected level;
  controllably transforming both polarization components at the focal plane by a selected variable retardation;
  thereafter rejecting a part of the individual polarization components dependent upon the selected variable retardation, and
  diffractively recombining the polarization components and individual beams into a modified DWDM beam.

60. The method of modifying individual wavelength signals as set forth in claim 59 above, comprising the steps of:

separating the DWDM beam before diffraction into orthogonal polarization components on initially diverging paths;

converging the separate polarization components at the focal plane, and polarization filtering the retarded beam components after reflection.

61. The method as set forth in claim 60 above, wherein the initial separation of the DWDM beam comprises splitting into s and p components and wherein both components are aligned parallel to the direction of diffraction separation prior to reaching the focal plane, and wherein the polarization components converge at different small angles toward incidence at the focal plane.

62. The method of claim 61 above, wherein the polarization components follow reciprocal paths after reflection which correspond to the incident path of the opposite polarization component, and wherein the areas of the wavelength component incident on the focal plane are approximately 20 times taller than wide.

63. The method as set forth in claim 62 above, wherein the polarization components for each individual wavelength beam are recombined in orthogonal relationship after being rediffracted towards convergence into a modified DWDM beam.

64. The method of modifying individual wavelength signals in a DWDM beam of arbitrary state of polarization comprising the steps of:

diffractively separating the DWDM beam while still in an arbitrary state of polarization;

dividing the separated beams into separate polarization components proximate to the focal plane;

directing the separated polarization components for each wavelength signal toward the focal plane in linear alignment;

separately varying the polarization direction of the polarization components for each wavelength signal;

rejecting a proportion of the polarization components while recombining the separate polarization components after reflection from the focal plane, and forming a modified DWDM beam by rediffraction of the individual wavelength signals.

65. The method as set forth in claim 64 above further comprising the step of reflectively retarding the polarization components at the focal plane to a degree corresponding to the desired amount of modification to provide elliptically polarized signals, and rejecting components of the elliptically polarized signals dependent upon the amount of retardation, and diffractively recombining the retarded signals.

66. The method as set forth in claim 65 above, wherein the rejection of signals comprises the steps of directing rejected components in an optical path that is out of the field of view of the modified components.

67. The method of equalizing signal gain within the spectral band of a wavelength multiplexed optical beam using a plurality of controllable attenuation elements disposed in a serial array, comprising the steps of:

demultiplexing the wavelength components into angularly dispersed individual beams spread along and impinging on the serial array, each of the beams having a cross-sectional area spanning more than one of the elements, controlling the attenuation introduced by the individual elements to selectively attenuate impinging portions of the individual beams such that the gain across the spectral band is equalized, and multiplexing the wavelength components after attenuation into a gain equalized output beam.

68. A method as set forth in claim 67 above, wherein the individual elements are reflective and arrayed in a one-dimensional series with a given pixel pitch such that all elements are within the $1/e^2$ optical impulse response of the individual wavelength component beams.

69. A beam control unit for receiving a nominally single wavelength optical beam from a sagittally dispersive diffractive source and controllably attenuating in the 0 to 20 dB range or extinguishing to greater than 40 dB comprising: a reflective liquid crystal cell having a front window and a spaced apart back window and nematic liquid crystal material in a cell gap therebetween, the facing surfaces of the windows each having a rubbed polyimide alignment coating aligned along a selected axis but the coatings being rubbed in anti-parallel senses, the cell having a sagittal active surface dimension and a substantially greater transverse active surface dimension, and including a reflecting surface and a distributed control electrode and an interpixel insulative barrier defining at least the sagittal boundary of the active surface area of the cell, the cell gap and interpixel barrier dimensions both being of like widths, and polarization diversity optics disposed proximate the front window of the cell in the path of the incident beam and comprising at least one birefringent optical element in the path of the single wavelength beam and the beam reflected from the active surface of the cell for rejecting beam components to an extent determined by the voltage on the control electrode.

70. A beam control unit as set forth in claim 69 above, wherein the beam is a single wavelength beam from a sagittally dispersed spectrum in the range of about 1300 nm to about 1700 nm and the beam includes sagittally dispersed sidebands, wherein the cell operates as a zero twist nematic liquid crystal, to phase retard the incident beam to an extent determined by the control voltage and wherein the local beam intensity on the active surface is nowhere greater than about 200 watts/mm$^2$; and wherein the cell gap and the interpixel barrier are each of the order of 4 microns.

71. A beam control unit as set forth in claim 70 above, wherein the data sidebands increase the $1/e^2$ optical intensity of the sagittal dimension of the beam by about 30 microns and wherein the active surface area of the cell has a sagittal dimension of about 85 microns and a transverse dimension of about 3 mm.

72. A beam control unit as set forth in claim 71 above, wherein the beam comprises converging incident beam components defining orthogonal beam polarization components having a like direction of polarization selected relative to the alignment direction of the cell, and the polarization diversity optics comprises a polarized optical element having a selected polarization vector to propagate the incident beams to the cell and to reject portions of reflected beams dependent on the phase retardation thereof.

73. A beam control unit as set forth in claim 71 above, wherein the beam comprises a single beam of arbitrary state of polarization and the polarization diversity optics comprises at least a serial pair of birefringent elements with optical axes aligned to split the incident beam into spatially displaced components of orthogonal polarization orientation and to recombine reflected components into a single beam while diverting a proportion of the beams to different paths, the proportion dependent on the phase retardation thereof.

74. A system for controlling the power of amplitude modulated individual wavelength beams that have been dispersed diffractively from a wavelength multiplexed optical beam having a spectral band of about 40 nm into a sagittal span of less than about 1 cm, and the beams being widened by amplitude modulation sidebands such that light is distributed with varying intensity with center wavelength peaks across the sagittal span, the system comprising:

an LC-SLM array having a plurality of cells distributed along the sagittal span and spaced to receive centrally the individual wavelength beam peaks, each cell being individually voltage controllable, the cells being zero twist nematic liquid crystal elements which reflect incident beams with selectable phase retardation, and having sagittal dimensions with reflective surface area sized to receive beams including sidebands down to 40 dB below the beam peak intensity, the transverse dimensions of the reflective surface areas being substantially greater than the sagittal such that the local power intensity of the incident beam is nowhere greater than the 200 W/mm$^2$ the array including a front window and a parallel back window spaced apart by a cell gap confining liquid crystal material, the back window having areally separated control electrodes for each cell to determine insulative sagittal boundaries between the adjacent cells, the boundaries being of the same order in dimension as the cell gap, to diminish effects of fringing fields between adjacent electrodes such that passbands for the individual beams are well separated by stop bands from adjacent beams, and at least one polarized optical element proximate to the array in the path of the incident beams in and reflected beams from the cells to reject such proportions of the individual beams as are determined by the phase retardation introduced thereto.

75. A system as set forth in claim 74 above, wherein the spectral band is in the range from 1300 nm to 1700 nm and the multiplexed beam defines about 80–100 channels each including data modulation at a rate of the order of 10 Gbps, wherein the cells have a selected alignment axis, and wherein the at least one polarized optical element has an optical axis in chosen relation to the alignment axis of the cells.

* * * * *